United States Patent
Nishikawa

(10) Patent No.: US 9,379,617 B2
(45) Date of Patent: Jun. 28, 2016

(54) RESONANT DC-DC CONVERTER CONTROL DEVICE

(71) Applicant: FUJI ELECTRIC CO., LTD., Kawasaki-shi (JP)

(72) Inventor: Yukihiro Nishikawa, Hino (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 0 days.

(21) Appl. No.: 14/372,449

(22) PCT Filed: Dec. 20, 2012

(86) PCT No.: PCT/JP2012/083068
§ 371 (c)(1),
(2) Date: Jul. 15, 2014

(87) PCT Pub. No.: WO2013/114758
PCT Pub. Date: Aug. 8, 2013

(65) Prior Publication Data
US 2014/0355313 A1    Dec. 4, 2014

(30) Foreign Application Priority Data
Feb. 3, 2012    (JP) .................................. 2012-021472

(51) Int. Cl.
*H02M 3/335*    (2006.01)
*H02M 1/08*    (2006.01)
(Continued)

(52) U.S. Cl.
CPC .......... *H02M 3/33507* (2013.01); *H02M 1/081* (2013.01); *H02M 1/088* (2013.01);
(Continued)

(58) Field of Classification Search
CPC ...................................................... H02M 3/335
USPC ............... 363/17, 21.09, 21.02, 21.01, 21.16, 363/21.05, 20, 98, 132
See application file for complete search history.

(56) References Cited

U.S. PATENT DOCUMENTS

RE33,866 E    3/1992    Schutten et al.
2004/0105280 A1    6/2004    Odaka
(Continued)

FOREIGN PATENT DOCUMENTS

EP    1973220 A1    9/2008
JP    H01-295675 A    11/1989
(Continued)

OTHER PUBLICATIONS

Li Dawei., "Research on LLC Resonant Switching Converter", Nanjing University of Aeronautics and Astronautics, Feb. 2010, English abstract.
(Continued)

*Primary Examiner* — Jeffrey Gblende
*Assistant Examiner* — Trinh Dang
(74) *Attorney, Agent, or Firm* — Rabin & Berdo, P.C.

(57) ABSTRACT

A control device is configured to, when the direct current output voltage of a resonant DC-DC converter is of a value that exceeds the maximum value that can be output in a fixed frequency control region, there is a switch from fixed frequency control to frequency modulation control. Because of this, conduction loss and turn-off loss caused by backflow current among semiconductor switching elements of the resonant DC-DC converter are reduced, power conversion efficiency is improved, and the range of voltage that can be output by the resonant DC-DC converter is expanded.

15 Claims, 19 Drawing Sheets

(51) Int. Cl.
*H02M 1/088* (2006.01)
*H02M 1/00* (2006.01)

(52) U.S. Cl.
CPC ........ *H02M3/3353* (2013.01); *H02M 3/33553* (2013.01); *H02M 3/33569* (2013.01); *H02M 2001/0003* (2013.01); *H02M 2001/0032* (2013.01); *H02M 2001/0058* (2013.01); *Y02B 70/1433* (2013.01); *Y02B 70/16* (2013.01)

(56) References Cited

U.S. PATENT DOCUMENTS

| | | | |
|---|---|---|---|
| 2009/0184698 A1 | 7/2009 | Nishikawa | |
| 2009/0284991 A1 | 11/2009 | Nishikawa | |
| 2010/0103710 A1* | 4/2010 | Reddy | 363/127 |
| 2011/0164437 A1 | 7/2011 | Sun et al. | |
| 2011/0205761 A1* | 8/2011 | Tschirhart et al. | 363/21.02 |
| 2011/0299302 A1 | 12/2011 | Ying et al. | |

FOREIGN PATENT DOCUMENTS

| | | |
|---|---|---|
| JP | 2002-262569 A | 9/2002 |
| JP | 2004-064859 A | 2/2004 |
| JP | 2006-174571 A | 6/2006 |
| JP | 2006-333690 A | 12/2006 |
| JP | 2009-177875 A | 8/2009 |
| JP | 2009-303474 A | 12/2009 |
| JP | 2010-011625 A | 1/2010 |
| WO | WO-2010/107060 A1 | 9/2010 |

OTHER PUBLICATIONS

Ju Li., "Hybrid Control for Full-Bridge LLC Converter", Nanjing University of Aeronautics and Astronautics, Mar. 2011, English abstract.

* cited by examiner 1 0 0 : Main circuit
$E_d$ : Direct current power supply
$Q_1, Q_2, Q_3, Q_4$ : MOSFET
$G_1, G_2, G_3, G_4$ : Gate
$L_r$ : Inductor
$C_r, C_o$ : Capacitor
$T_r$ : Transformer
$N_p$ : 1 Primary coil
$N_s$ : 2 Secondary coil
$D_1, D_2, D_3, D_4$ : Diode
$R_a, R_b$ : Resitor
Cont : Control device
CT : Current detector

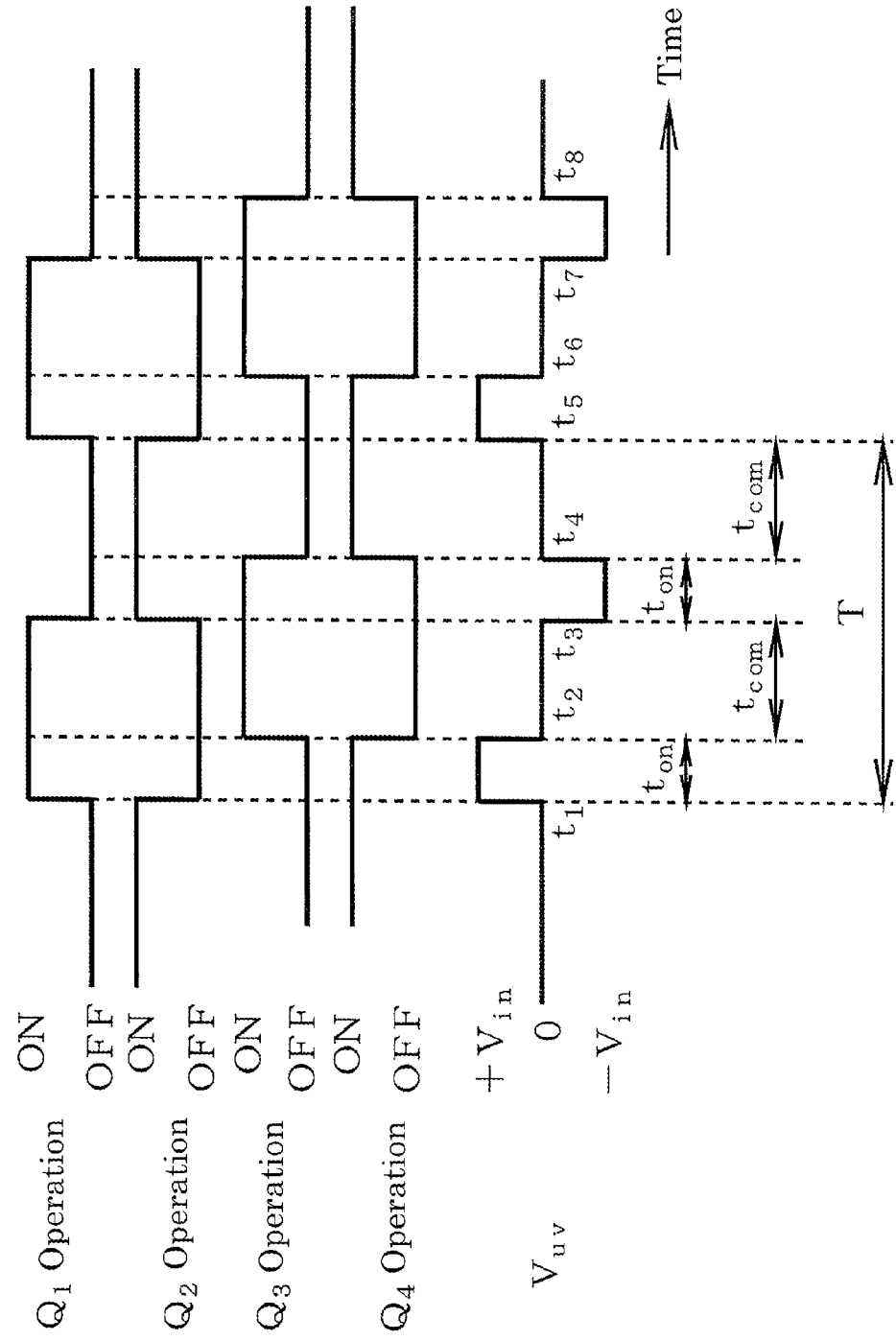

1

RESONANT DC-DC CONVERTER CONTROL DEVICE

TECHNICAL FIELD

The present invention relates to technology of controlling a resonant DC-DC converter that, being a DC-DC converter wherein a direct current output voltage isolated from a direct current power supply is obtained, is preferred as, for example, a charger of a battery wherein power supply voltage and output voltage vary over a wide range.

BACKGROUND ART

FIG. 14 is a main circuit configuration diagram of a heretofore known DC-DC converter, and is described in PTL 1 (identified further on).

In FIG. 14, $E_d$ is a direct current power supply, $Q_1$ to $Q_4$ are MOSFETs (Metal Oxide Semiconductor Field Effect Transistors) acting as semiconductor switching elements, Tr is a transformer, $N_p$ is a primary coil of the transformer Tr (the turn number is also assumed to be NO, $N_p$ in the same way, is a secondary coil (the turn number is also assumed to be $N_s$), $D_1$ to $D_4$ are diodes, $Sn_1$ to $Sn_4$ are snubber circuits, $L_o$ is an inductor, and $C_o$ is a smoothing capacitor. Also, $V_{out}$ and $R_{tn}$ indicate output terminals, $V_{in}$ a direct current input voltage, and $V_o$ a direct current output voltage.

In FIG. 14, an alternating current voltage generated in the secondary coil $N_s$ of the transformer Tr by switching of the MOSFETs $Q_1$ to $Q_4$ is full-wave rectified by a bridge rectifier circuit formed of the diodes $D_1$ to $D_4$, and thus converted into a direct current voltage. The direct current voltage is smoothed by a smoothing circuit formed of the inductor $L_o$ and smoothing capacitor $C_o$, and output from the output terminals $V_{out}$ and $R_{tn}$.

This heretofore known technology includes the snubber circuits $Sn_1$ to $Sn_4$ in order to suppress surge voltage generated when there is reverse recovery of the diodes $D_1$ to $D_4$. However, there is a problem in that the higher the switching frequency, the greater the increase in resistance loss in the snubber circuits $Sn_1$ to $Sn_4$, and conversion efficiency as a DC-DC converter decreases.

Next, FIG. 15 is a main circuit configuration diagram of a heretofore known resonant DC-DC converter, and is described in PTL 2 and PTL 3 (both identified further on).

In FIG. 15, an inductor $L_r$ and capacitor $C_r$ configuring an LC series resonant circuit are connected to the primary coil $N_p$ of the transformer Tr, while other elements are given the same reference signs as in FIG. 14.

In the circuit of FIG. 15, an alternating current voltage generated in the secondary coil $N_s$ of the transformer Tr is full-wave rectified by the bridge rectifier circuit formed of the diodes $D_1$ to $D_4$, and thus converted into a direct current voltage. Further, the direct current voltage is smoothed by the smoothing capacitor $C_o$, and output from the direct current output terminals $V_{out}$ and $R_{tn}$.

This heretofore known technology is characterized in that, as the voltage across the diodes $D_1$ to $D_4$ is clamped at the direct current output voltage when there is reverse recovery of the diodes $D_1$ to $D_4$, the snubber circuits $Sn_1$ to $Sn_4$ shown in FIG. 14 are unnecessary, and conversion efficiency higher than that of the circuit of FIG. 14 is obtained.

Frequency modulation control described in PTL 4 (identified further on) is known as one example of a method of controlling the direct current output voltage of the circuit shown in FIG. 15.

FIG. 16 shows the relationship between a normalized frequency F and a normalized voltage conversion rate M in the case of the frequency modulation control described in PTL 4. Herein, the normalized frequency F is the ratio of a switching frequency $F_s$ of the switching elements $Q_1$ to $Q_4$ of FIG. 15 to a series resonant frequency $F_r$ of the inductor $L_r$ and capacitor $C_r$, and is expressed by $F=F_s/F_r$.

Also, the normalized voltage conversion rate M is the ratio of the direct current output voltage $V_o$ to the direct current input voltage $V_{in}$ ($V_o/V_{in}$) multiplied by a turn ratio $n=N_p/N_s$, and is expressed by $M=n \cdot V_o/V_{in}$.

The resonant DC-DC converter shown in FIG. 15 is such that the characteristics of the normalized frequency F and normalized voltage conversion rate M change in accordance with the weight of the load, as shown in FIG. 16. In the case of a light load, the normalized voltage conversion rate M does not drop to or below a certain value, regardless of how far the normalized frequency F is increased, because of which the output voltage range is narrow. Consequently, when the resonant DC-DC converter is used in a battery charger or the like, it is difficult to charge a battery that is in an over-discharged state. Phase modulation control described in PTL 2, and a control method whereby there is switching between frequency modulation control and phase modulation control described in PTL 3, are known as ways of resolving the heretofore described problem of the output voltage range being narrow.

FIG. 17 shows the relationship between the normalized frequency F and normalized voltage conversion rate M in the case of the phase modulation control based on PTL 2.

The technology disclosed in PTL 2 is such that, as phase modulation control (phase shift control) is executed with the normalized frequency F as 1, that is, with the switching frequency $F_s$ equivalent to the series resonant frequency $F_r$, as shown in FIG. 17, the output voltage range of the DC-DC converter is wider than in FIG. 16.

Also, FIG. 18 shows the relationship between the normalized frequency F and normalized voltage conversion rate M in the case of the frequency modulation control and phase modulation control disclosed in PTL 3.

The technology disclosed in PTL 3 is such that, as shown in FIG. 18, frequency modulation control is executed in a range from the normalized frequency F to a maximum frequency $F_{max}$, and with regard to a voltage range in which output is not possible with frequency modulation control, the output voltage range is expanded beyond that in FIG. 16 by switching to phase modulation control whereby the switching frequency $F_s$ is fixed at the maximum frequency $F_{max}$.

Herein, FIG. 19 is a timing chart showing an operation when executing phase modulation control with the circuit shown in FIG. 15 as a target, and is described in PTL 2. The operation is such that, for example, by repeating an operation whereby the MOSFETs $Q_1$ and $Q_3$ are put into an on-state for a period of times $t_2$ to $t_3$ within one cycle T, and the MOSFETs $Q_2$ and $Q_4$ are put into an on-state for a period of times $t_4$ to $t_5$, a period $t_{com}$ (a commutation period), for which an output voltage $V_{uv}$ of the full-bridge circuit formed of the MOSFETs $Q_1$ to $Q_4$ is zero, and a period $t_{on}$ (a conduction period), for which the output voltage $V_{uv}$ is $+V_{in}$ or $-Y_{in}$, are generated.

The conduction period $t_{on}$ is a period for which the voltage of the direct current power supply $E_d$ is applied to the series resonant circuit, while the commutation period $t_{com}$ is a period for which the voltage of the direct current power supply $E_d$ is not applied to the series resonant circuit, and by controlling the conduction period $t_{on}$ by shifting the phases in which the MOSFETs $Q_1$ to $Q_4$ are turned on or off, it is possible to control the direct current output voltage $V_o$ to a predetermined value.

CITATION LIST

Patent Literature

PTL 1: JP-A-1-295675 (page 1, bottom right section, line 2 to line 13, FIG. 3, and the like)
PTL 2: JP-A-2010-11625 (paragraphs [0028] to [0037], FIG. 1 to FIG. 4, and the like)
PTL 3: JP-A-2002-262569 (paragraphs [0014] and [0015], FIG. 1, and the like)
PTL 4: JP-A-2006-174571 (paragraphs [0009] to [0017], FIG. 1 to FIG. 5, and the like The phase modulation control method disclosed in PTL 2 is such that, when the resonant DC-DC converter is used in an application wherein the direct current input voltage and direct current output voltage vary over a wide range, such as in a battery charger, the following kind of problem exists.

That is, in FIG. 19, the longer the commutation period $t_{com}$ for which the voltage $V_{uv}$ is zero owing to the MOSFETs $Q_1$ and $Q_3$ or MOSFETs $Q_2$ and $Q_4$ being simultaneously in an on-state, the greater the increase in conduction loss caused by backflow current between the MOSFETs $Q_1$ and $Q_3$ or MOSFETs $Q_2$ and $Q_4$ that are in an on-state, and power conversion efficiency as a DC-DC converter decreases.

Meanwhile, the control method whereby there is switching between frequency modulation control and phase modulation control described in PTL 3 is such that, as it is possible to narrow the voltage range in which operation is carried out by phase modulation control, it is possible to reduce the conduction loss caused by backflow current.

However, as is clear from FIG. 18, there is a problem in that operation is carried out in a region in which the switching frequency $F_s$ is higher than the series resonant frequency $F_r$, and the current flowing through the MOSFETs at the timing at which the MOSFETs $Q_1$ to $Q_4$ are turned off may be in the vicinity of the peak value of the resonance current, which leads to an increase in switching loss and a decrease in conversion efficiency.

Therefore, an object of the invention is to expand the range of voltage that can be output by a resonant DC-DC converter. Also, another object of the invention is to reduce conduction loss and turn-off loss caused by backflow current between semiconductor switching elements, thus improving the power conversion efficiency of a resonant DC-DC converter.

SUMMARY

In order to resolve the heretofore described problems, the invention relates to a control device for a resonant DC-DC converter including a direct current power supply, a full-bridge circuit of which the input side is connected to both ends of the direct current power supply and to the output side of which a primary coil of a transformer is connected via a series resonant circuit, and which is configured of semiconductor switching elements, a rectifier circuit connected to a secondary coil of the transformer, and a smoothing capacitor connected to the output side of the rectifier circuit, wherein, by the semiconductor switching elements being turned on and off to cause a resonance current to flow through the series resonant circuit, a direct current voltage is output via the transformer, rectifier circuit, and smoothing capacitor.

Further, the control device of the invention includes a means for detecting a quantity of electricity, such as a direct current output voltage or direct current output current, in accordance with the status of a load of the resonant DC-DC converter, and determining a control amount for controlling the turning on and off of the semiconductor switching elements. Also, the control device of the invention includes a frequency modulation control means for executing a frequency modulation control of the semiconductor switching elements at a frequency lower than a resonance frequency of the series resonant circuit based on the determined control amount, a fixed frequency control means for executing a fixed frequency control of the semiconductor switching elements at a frequency in the vicinity of the resonance frequency based on the control amount, and a pulse distribution means for generating drive pulses of the semiconductor switching elements using a logical operation based on outputs of the frequency modulation control means and fixed frequency control means.

Further, the invention is such that when the direct current output voltage of the resonant DC-DC converter reaches a value such that exceeds the maximum value that can be output in a fixed frequency control region, the control amount is switched from fixed frequency control to frequency modulation control.

Herein, it is preferable that the fixed frequency control means executes pulse width modulation control of the semiconductor switching elements of the resonant DC-DC converter by comparing the control amount and a carrier signal generated by the frequency modulation control means, and generating a pulse width modulation signal.

Also, the fixed frequency control means may compare the control amount and a carrier signal, generate a pulse width modulation signal, and generate a phase modulation signal from the pulse width modulation signal and a frequency modulation signal generated by the frequency modulation control means, thus executing phase modulation control of the semiconductor switching elements of the converter.

Furthermore, the fixed frequency control means may execute pulse width modulation control and phase modulation control of the semiconductor switching elements of the converter.

In this case, the fixed frequency control means compares the control amount and a carrier signal, generates a pulse width modulation signal, generates a phase modulation signal from the pulse width modulation signal and a frequency modulation signal, and switches between pulse width modulation control and phase modulation control in accordance with a direct current output current or direct current output voltage of the converter.

Also, the fixed frequency control means, when the converter is started up, may switch to phase modulation control after executing pulse width modulation control, thus initially charging the smoothing capacitor in a state wherein the pulse width is shorter than a half cycle of the resonance frequency. Furthermore, the fixed frequency control means may switch to frequency modulation control after initially charging the smoothing capacitor.

In order that the direct current output voltage and direct current output current of the converter are of predetermined values, it is preferable that the control amount is determined by an error amplifier or the like, using the detection values of the direct current output voltage and direct current output current.

ADVANTAGEOUS EFFECTS OF INVENTION

According to the invention, by executing fixed frequency control in the vicinity of the resonance frequency of the series resonant circuit and executing frequency modulation control at a frequency lower than the resonance frequency, it is possible to expand the range of voltage that can be output by the resonant DC-DC converter, and to eliminate variation in the direct current output voltage when switching between fixed frequency control and frequency modulation control.

Herein, the fixed frequency control means is configured of pulse width modulation control means or phase modulation control means, and the main portion of these control means can be realized by sharing a limiter, comparator, and the like.

Also, the semiconductor switching elements are turned off after a half cycle of the resonance current is passed, because of which the momentary value of the resonance current when turning off is sufficiently smaller than the peak value of the resonance current, and it is possible to reduce turn-off loss. Furthermore, when executing phase modulation control, the lighter the load, the greater the conduction loss due to backflow current among the semiconductor switching elements, but the invention is such that, by pulse width modulation control being executed when there is a light load, all of the semiconductor switching elements are in an off-state during a non-exciting period of the transformer, because of which no backflow current occurs, and it is possible to reduce conduction loss.

Because of this, according to the invention, it is possible to improve the power conversion efficiency of the resonant DC-DC converter.

BRIEF DESCRIPTION OF THE DRAWINGS

FIG. 19 is a timing chart showing an operation when executing phase modulation control with the circuit shown in FIG. 15 as a target.

DETAILED DESCRIPTION

Hereafter, based on the drawings, a description will be given of an embodiment of the invention.

Figure 1:
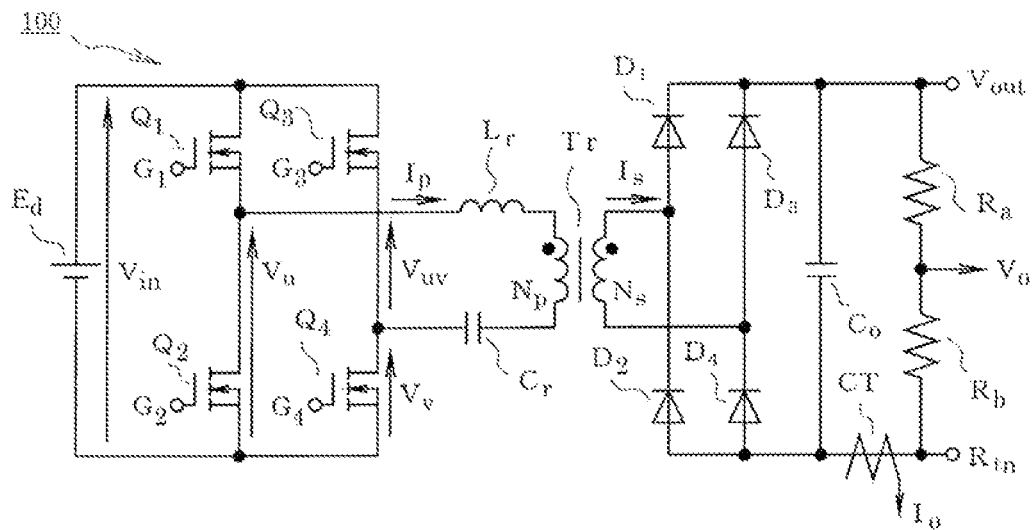
FIG. 1 is a circuit diagram showing a main circuit of a resonant DC-DC converter according to an embodiment of the invention together with a control device.
Figure 1:
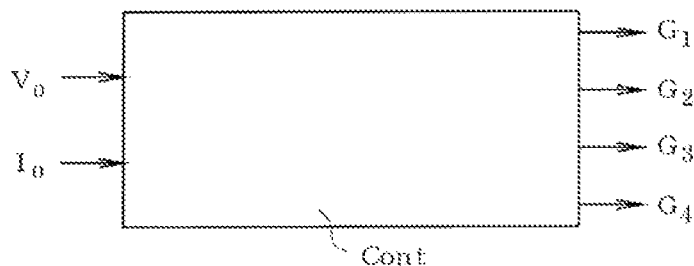

Firstly, FIG. 1 is a circuit diagram showing a main circuit 100 of a resonant DC-DC converter according to an embodiment of the invention together with a control device Cont.

In the main circuit 100 of FIG. 1, a full-bridge circuit formed of MOSFETs $Q_1$ to $Q_4$ acting as semiconductor switching elements is connected to both ends of a direct current power supply $E_d$. $G_1$ to $G_4$ are the gates of the MOSFETs $Q_1$ to $Q_4$, and hereafter, the description will be given with the same reference signs $G_1$ to $G_4$ given to gate pulses too.

An inductor $L_r$, a primary coil $N_p$ of a transformer Tr, and a capacitor $C_r$ are connected in series between a series connection point of the MOSFETs $Q_1$ and $Q_2$ and a series connection point of the MOSFETs $Q_3$ and $Q_4$. Herein, the inductor $L_r$ and capacitor $C_r$ configure an LC series resonant circuit.

A bridge rectifier circuit formed of diodes $D_1$ to $D_4$ is connected to both ends of a secondary coil $N_s$ of the transformer Tr, and a smoothing capacitor $C_o$ is connected between direct current output terminals of the bridge rectifier circuit. Also, a series circuit of resistors $R_a$ and $R_b$ is connected to both ends of the smoothing capacitor $C_o$.

$V_{out}$ and $R_{tn}$ are direct current output terminals, $V_{in}$ is a direct current input voltage, $V_u$, is the voltage of the series connection point of the MOSFETs $Q_1$ and $Q_2$, $V_v$ is the voltage of the series connection point of the MOSFETs $Q_3$ and $Q_4$, and $V_{uv}$ is the difference in voltage between $V_u$, and $V_v$.

The circuit is such that, assuming a value of the voltage across the smoothing capacitor $C_o$ divided by the resistors $R_a$ and $R_b$ to be a direct current output voltage detection value $V_o$, a direct current output current detection value $I_o$ is obtained from the output of a current detector CT connected to the negative side line of the bridge rectifier circuit. The direct current output voltage detection value $V_o$ and direct current output current detection value $I_o$ are input into the control device Cont, and gate pulses $G_1$ to $G_4$ acting as drive pulses of the MOSFETs $Q_1$ to $Q_4$ are generated by an operation in the control device Cont. The MOSFETs $Q_1$ to $Q_4$ are switched by the gate pulses $G_1$ to $G_4$ being provided to the MOSFETs $Q_1$ to $Q_4$ via an unshown gate drive circuit.

Herein, with regard to generating the gate pulses $G_1$ to $G_4$ with the control device Cont, the detection value of a primary current $I_p$ or secondary current $I_s$ of the transformer Tr may also be used in addition to the direct current output voltage detection value $V_o$ and direct current output current detection value $I_o$.

Next, a description will be given, while referring to FIG. 2, of control characteristics of the embodiment.

Figure 2:
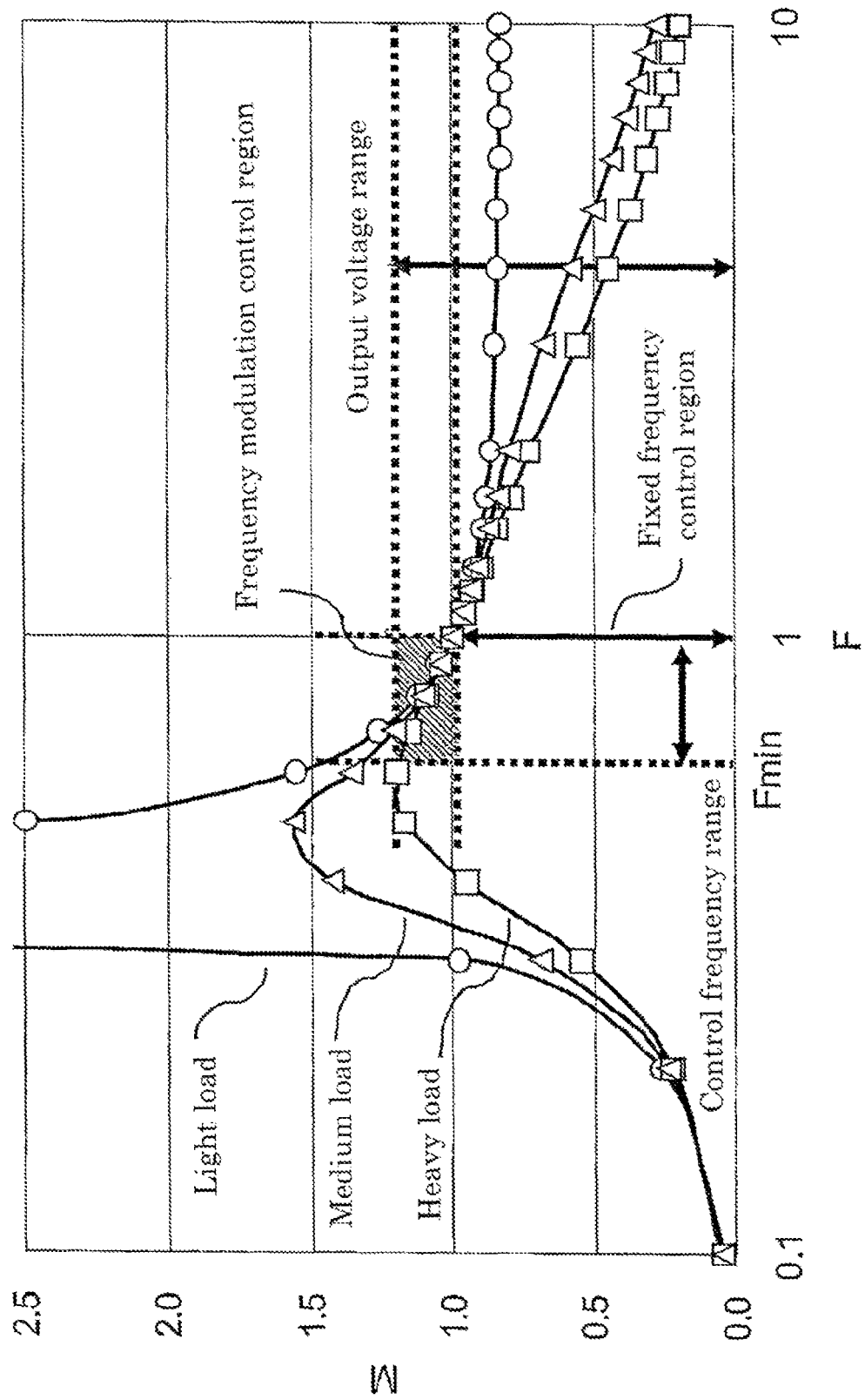
FIG. 2 is a characteristic diagram showing the relationship between a normalized frequency and a normalized voltage conversion rate in the embodiment of the invention.

FIG. 2 is a characteristic diagram showing the relationship between a normalized frequency F and a normalized voltage conversion rate M wherein the normalized frequency $F=F_s/F_r$ ($F_s$ is the switching frequency of the MOSFETs $Q_1$ to $Q_4$, while $F_r$ is the resonance frequency), and the normalized voltage conversion rate $M=n \cdot V_o/V_{in}$, (n is the turn ratio of the transformer $T_r$, $V_o$ is the direct current output voltage, and $V_{in}$ is the direct current input voltage).

The control device Cont of FIG. 1 includes a fixed frequency control means for carrying out a fixed frequency control at a switching frequency $F_s$ practically equivalent to the resonance frequency $F_r$ of the LC series resonant circuit formed of the inductor $L_r$ and capacitor $C_r$ (that is, the fixed frequency control means controls at a state wherein F=1), and a frequency modulation control means for controlling a frequency modulation at a switching frequency $F_s$ lower than the resonance frequency $F_r$ (that is, the frequency modulation control means controls in a state wherein F<1).

Further, when the direct current output voltage $V_o$ exceeds the maximum value the DC-DC converter can output in a fixed frequency control region, the control method is switched from the fixed frequency control to frequency modulation control. That is, in FIG. 2, the distance from M=0 to the intersection of the F=1 characteristic line and load characteristic lines (a light load characteristic line, a medium load characteristic line, and a heavy load characteristic line) corresponds to the range of voltage that can be output in the fixed frequency control region.

As is clear from FIG. 2, the normalized voltage conversion rate M is 1 at the intersection of the F=1 characteristic line and load characteristic lines, regardless of the weight of the load. That is, the maximum value of the direct current output voltage of the DC-DC converter in the fixed frequency control region is a value corresponding to M=1.

Also, by arranging so that a region wherein M exceeds 1 is a frequency modulation control region, the output voltage of the DC-DC converter can be switched seamlessly, without being caused to change sharply, before and after switching with fixed frequency control.

Figure 3:
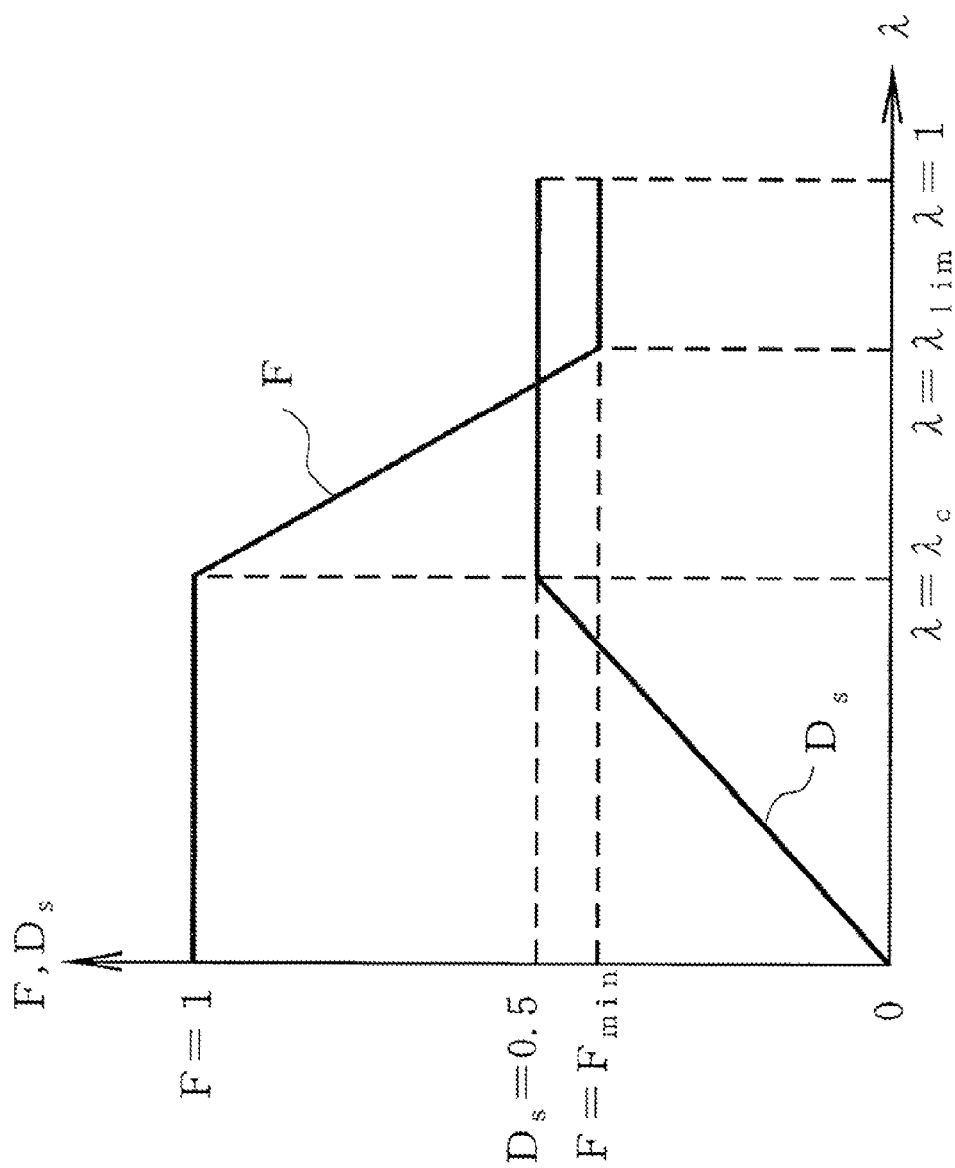
FIG. 3 is a characteristic diagram showing the relationship between a control amount, which causes a MOSFET to be turned on and off, and the normalized frequency and a duty in the embodiment of the invention.

FIG. 3 shows the relationship between a control amount $\lambda$, which causes the MOSFETs $Q_1$ to $Q_4$ to be turned on and off, and the normalized frequency F and duty $D_s$.

The control amount $\lambda$ is regulated using an error amplifier, or the like, based on the direct current output voltage detection value $V_o$ and direct current output current detection value $I_o$ in FIG. 1, so that the direct current output voltage and direct current output current are of desired values. The range of the control amount $\lambda$ is $0 \leq \lambda \leq 1$.

The duty $D_s$ is the ratio of the on-state time of each MOSFET to the switching cycle in a first example (FIG. 4) of the control device Cont, to be described hereafter, while in a second example (FIG. 9) of the control device Cont, the duty $D_s$ is the ratio of the phase modulation time of the voltage $V_u$ of the series connection point of the MOSFETs $Q_1$ and $Q_2$ and voltage $V_v$ of the series connection point of the MOSFETs $Q_3$ and $Q_4$ to the switching cycle.

Herein, in FIG. 3, the normalized frequency F is limited to $F_{min}$ when $\lambda$ exceeds $\lambda_{lim}$. Hereafter, a description will be given of the reason for this.

In FIG. 2, when the normalized frequency F is lower than at a point each load characteristic at which the normalized voltage conversion rate M peaks, a state called off-resonance occurs. When off-resonance occurs, resonance current flowing through one MOSFET of two serially-connected MOSFETs in FIG. 1 is commutated to a parasitic diode, at which timing the other MOSFET is turned on. At this time, because reverse recovery of the parasitic diode of the one MOSFET occurs at a steep current change rate, the MOSFET may become damaged. In order to prevent this, in FIG. 3, $F_{min}$ is set to a frequency higher than the frequency at which the normalized voltage conversion rate M peaks for the heavy load characteristic of the characteristics of FIG. 2, and the normalized frequency F is limited to $F_{min}$ in a region wherein $\lambda > \lambda_{lim}$.

Figure 4:
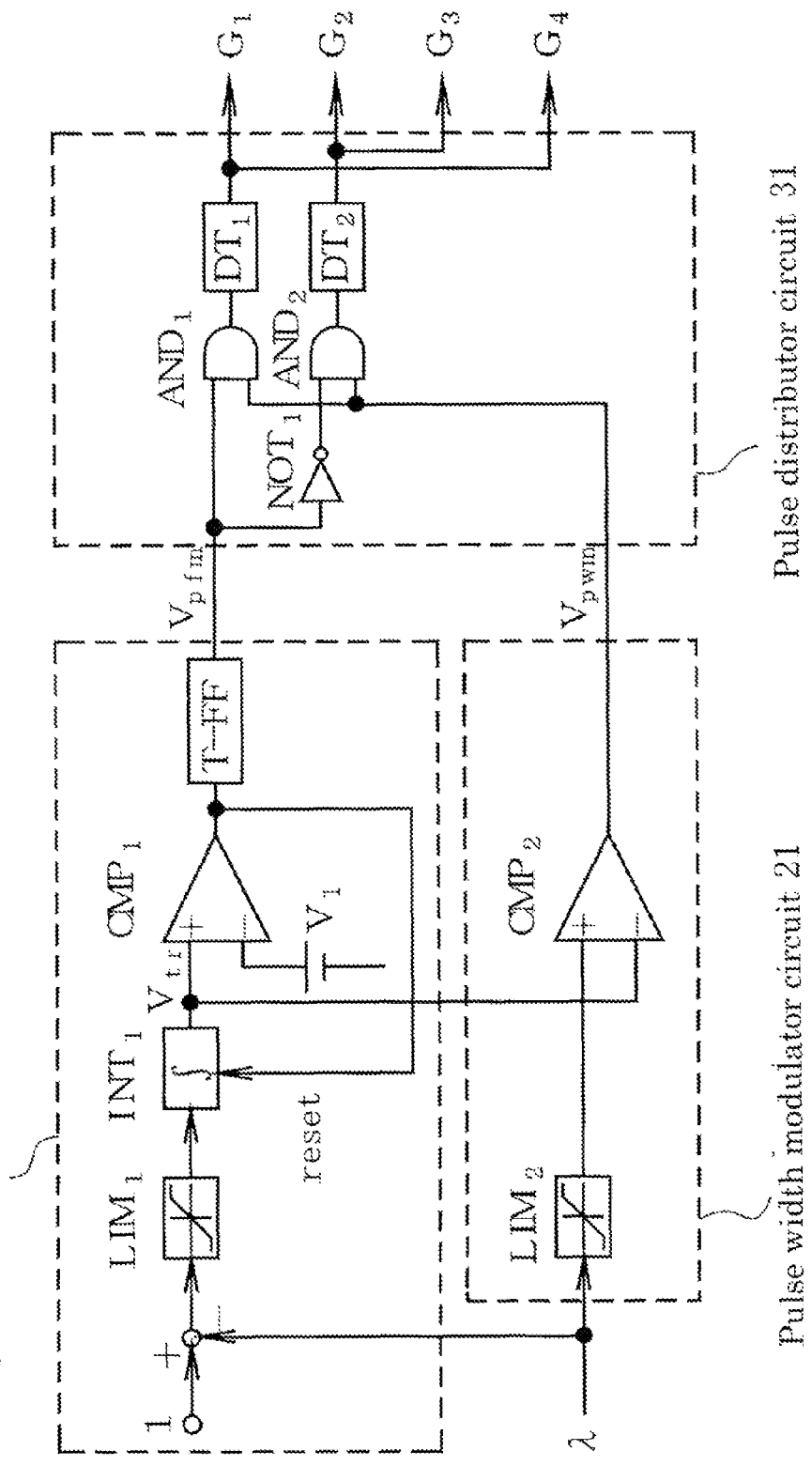
FIG. 4 is a block diagram showing a first example of the control device in the embodiment of the invention.

Next, FIG. 4 is a block diagram showing the first example of the control device Cont in the embodiment.

In FIG. 4, 11 is a frequency modulator circuit acting as the frequency modulation control means, 21 is a pulse width modulator circuit acting as the fixed frequency control means, and 31 is a pulse distributor circuit. A frequency modulation signal $V_{pfm}$ output from the frequency modulator circuit 11 and a pulse width modulation signal $V_{pwm}$, output from the pulse width modulator circuit 21 are input into the pulse distributor circuit 31, and the gate pulses $G_1$ to $G_4$ of the MOSFETs $Q_1$ to $Q_4$ are generated by a logical operation in the pulse distributor circuit 31.

The frequency modulator circuit 11 includes a limiter $LIM_1$, into which is input the deviation between "1" and the control amount $\lambda$, an integrator $INT_1$, into which is input an output signal of the limiter $LIM_1$, a comparator $CMP_1$, which compares the sizes of a carrier signal $V_{tr}$ output from the integrator $INT_1$ and a reference voltage $V_1$, and a T flip-flop T-FF, acting as frequency dividing means into which is input an output signal of the comparator $CMP_1$, wherein the frequency modulation signal $V_{pfm}$ is output from the T flip-flop T-FF.

The reference voltage $V_1$ of the comparator $CMP_1$ is set to a value equivalent to $\lambda_c$. Also, the control amount $\lambda$, is generated based on the direct current output voltage detection value $V_o$ and direct current output current detection value $I_o$, as previously described.

An integration time constant of the integrator $INT_1$ is regulated so that F=1 when $\lambda = \lambda_c$, as shown in FIG. 3. As the integrator $INT_1$ is reset by an output signal (a reset signal reset) from the comparator $CMP_1$ when the carrier signal $V_{tr}$, which is the output of the integrator $INT_1$, reaches $\lambda_c$, the integrator $INT_1$ operates in such a way that the carrier signal $V_{tr}$ is of a sawtooth form.

Also, the frequency of the output signal of the comparator $CMP_1$ is divided by the T flip-flop T-FF, and the frequency modulation signal $V_{pfm}$ with a duty of 50% ($D_s=0.5$) is output from the T flip-flop T-FF.

Meanwhile, the pulse width modulator circuit 21 is configured of a limiter $LIM_2$, into which is input the control amount $\lambda$, and a comparator $CMP_2$, which compares the sizes of an output signal of the limiter $LIM_2$ and the carrier signal $V_{tr}$. Further, an output signal of the comparator $CMP_2$ is input into the pulse distributor circuit 31 as the pulse width modulation signal $V_{pwm}$.

The pulse distributor circuit 31 is configured of an AND gate $AND_1$, into which are input the frequency modulation signal $V_{pfm}$ and pulse width modulation signal $V_{pwm}$, a NOT gate $NOT_1$, which inverts the logic of the frequency modulation signal $V_{pfm}$, an AND gate $AND_2$, into which are input an output signal of the NOT gate $NOT_1$ and the pulse width modulation signal $V_{pwm}$, and on-delay circuits $DT_1$ and $DT_2$, into which are input output signals of the AND gates $AND_1$ and $AND_2$ respectively, wherein the gate pulses $G_1$ and $G_4$ are obtained as outputs of the on-delay circuit $DT_1$, and the gate pulses $G_2$ and $G_3$ are obtained as outputs of the on-delay circuit $DT_2$.

In order to prevent a simultaneous turning on of the MOSFETs $Q_1$ and $Q_2$, or a simultaneous turning on of the MOSFETs $Q_3$ and $Q_4$, the on-delay circuits $DT_1$ and $DT_2$ delay the gate pulses $G_1$ and $G_4$ and the gate pulses $G_2$ and $G_3$ by a time $t_d$.

Further, the previously described limiter $LIM_1$ of the frequency modulator circuit 11 and limiter $LIM_2$ of the pulse width modulator circuit 21 are used to switch between frequency modulation control and pulse width modulation control at the fixed frequency in accordance with the control amount $\lambda$. Herein, the lower limit value of the limiter $LIM_1$ is set at $1-\lambda_c$ and the upper limit value at $\lambda_{lim}$ of FIG. 3, while the lower limit value of the limiter $LIM_2$ is set at 0 and the upper limit value at $\lambda_c$ of FIG. 3.

Because of this, when $\lambda$, is smaller than $\lambda_c$, the input signal of the integrator $INT_1$ is limited to $1-\lambda_c$, the frequency of the carrier signal $V_{tr}$ is constant, and pulse width modulation control at the fixed frequency is executed.

Figure 5:
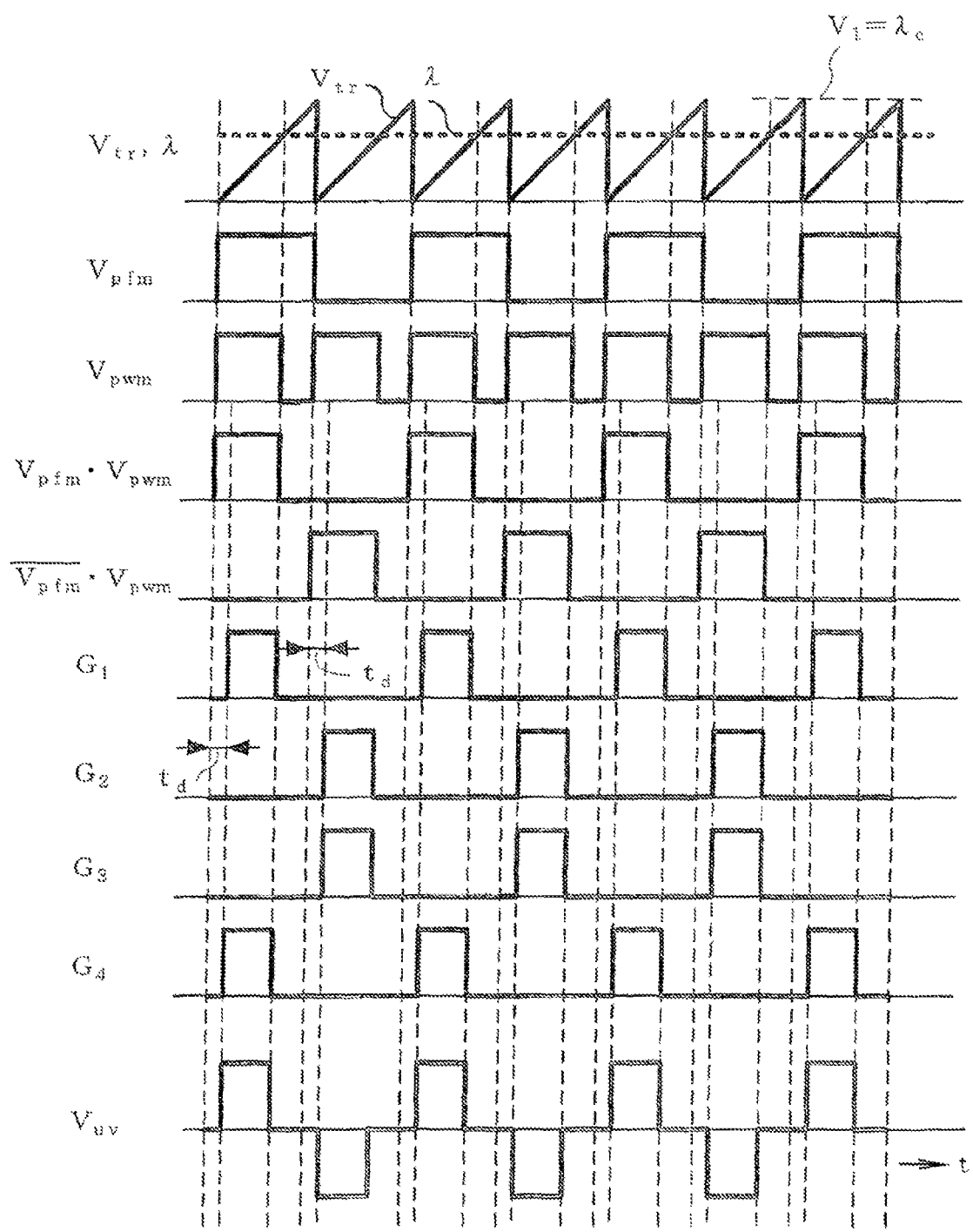
FIG. 5 is a waveform diagram representing a control operation when pulse width modulation control is executed in the first example.
Figure 6:
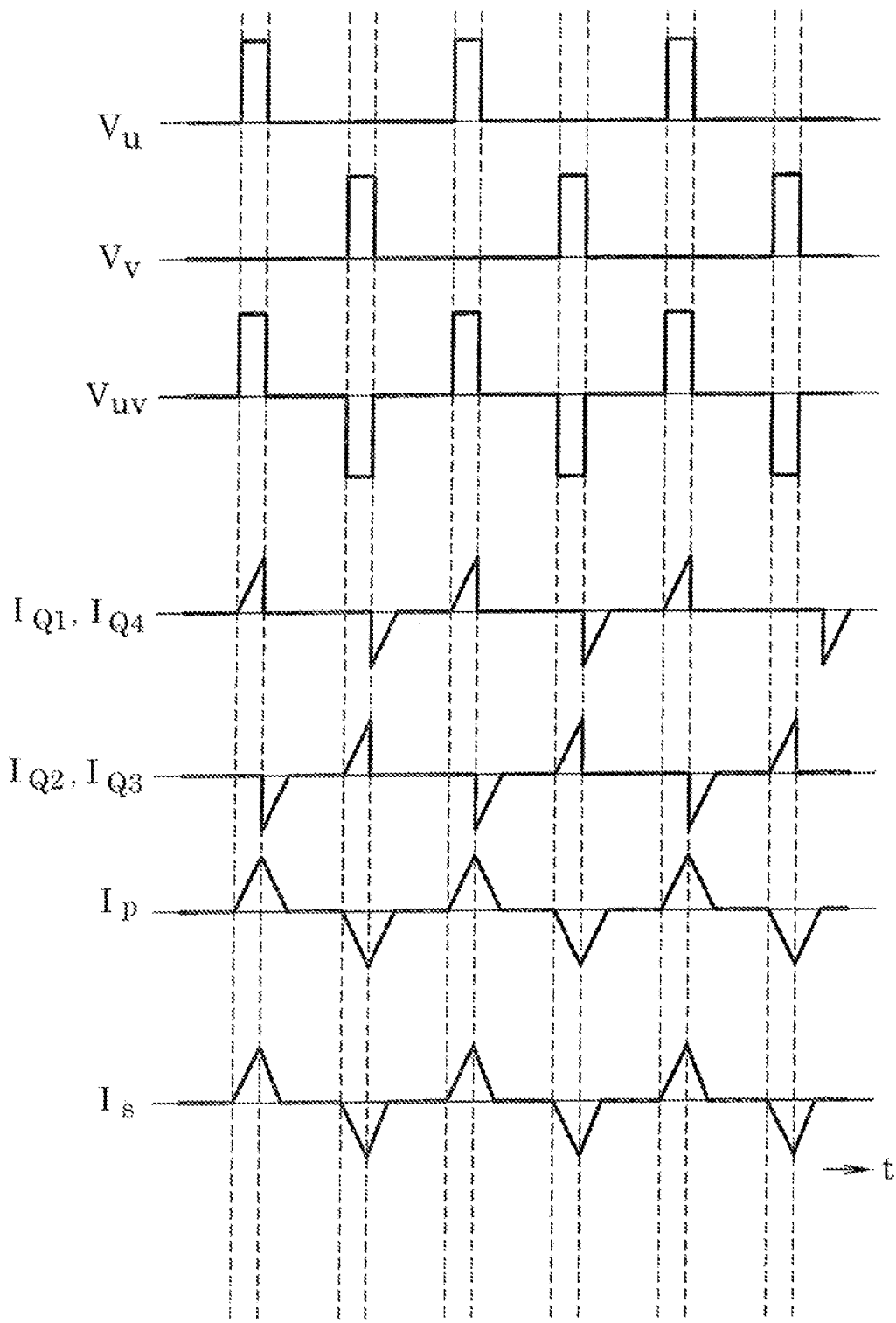
FIG. 6 is a waveform diagram representing a main circuit operation when pulse width modulation control is executed in the first example.

FIG. 5 is a waveform diagram for illustrating an operation of the control device Cont in the first example when pulse width modulation control is executed, while FIG. 6 is a waveform diagram for illustrating an operation of the main circuit.

As shown in FIG. 5, the pulse width modulation signal $V_{pwm}$ is output from the comparator $CMP_2$ in accordance with the relationship between the sizes of the control amount $\lambda$ and the carrier signal $V_{tr}$. Meanwhile, the frequency modulation signal $V_{pfm}$ after the frequency of the output signal of the comparator $CMP_1$ is divided is output from the T flip-flop T-FF.

The AND gates $AND_1$ and $AND_2$ in the pulse distributor circuit 31 of FIG. 4 carry out a logical operation using the pulse width modulation signal $V_{pwm}$, the frequency modulation signal $V_{pfm}$, and inversion signals thereof. Furthermore, as shown in FIG. 5, the delay time $t_d$ is applied to the output signals of the AND gates $AND_1$ and $AND_2$ by the on-delay circuits $DT_1$ and $DT_2$, generating the gate pulses $G_1$ to $G_4$ of the MOSFETs $Q_1$ to $Q_4$.

Owing to the MOSFETs $Q_1$ to $Q_4$ being switched by the gate pulses $G_1$ to $G_4$, the voltage $V_{uv}$ in the main circuit of FIG. 1 has the kind of waveform shown on the bottom level of FIG. 5.

Also, the voltages of each portion in the main circuit of FIG. 1, including the voltage $V_{uv}$, are such that the current waveforms are as in FIG. 6.

Next, when $\lambda$, is larger than $\lambda_c$, the frequency of the carrier signal $V_{tr}$ changes in accordance with the value of $\lambda$. At this time, as the maximum value of the carrier signal $V_{tr}$ is $\lambda_c$, the output of the comparator $CMP_2$ is constantly at a high level, and frequency modulation control is executed. That is, when the direct current output voltage of the resonant DC-DC converter reaches a value such that exceeds the maximum value that can be output in the fixed frequency control region, the control amount $\lambda$ is switched from fixed frequency control to frequency modulation control.

Figure 7:
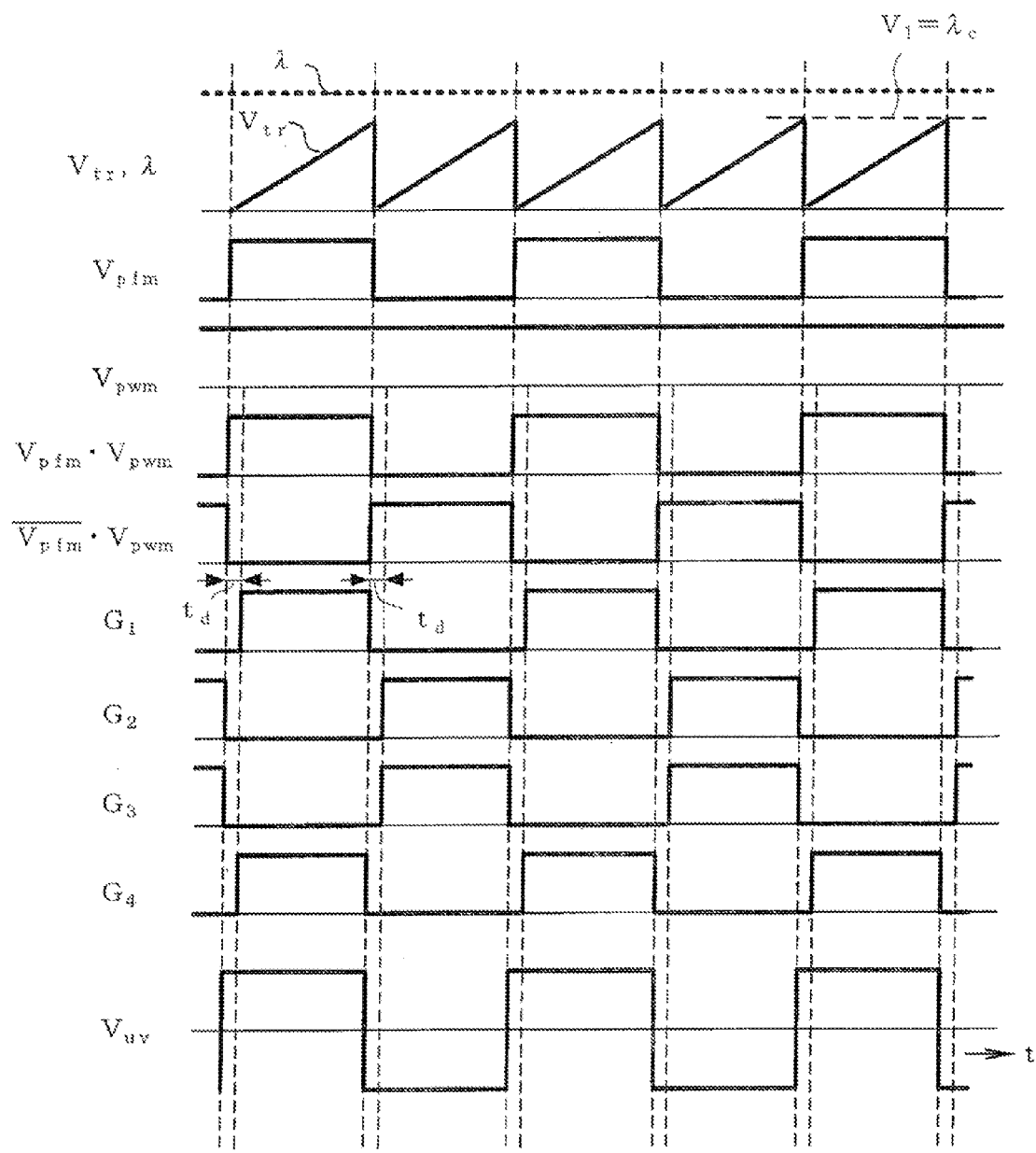
FIG. 7 is a waveform diagram representing a control operation when frequency modulation control is executed in the first example.
Figure 8:
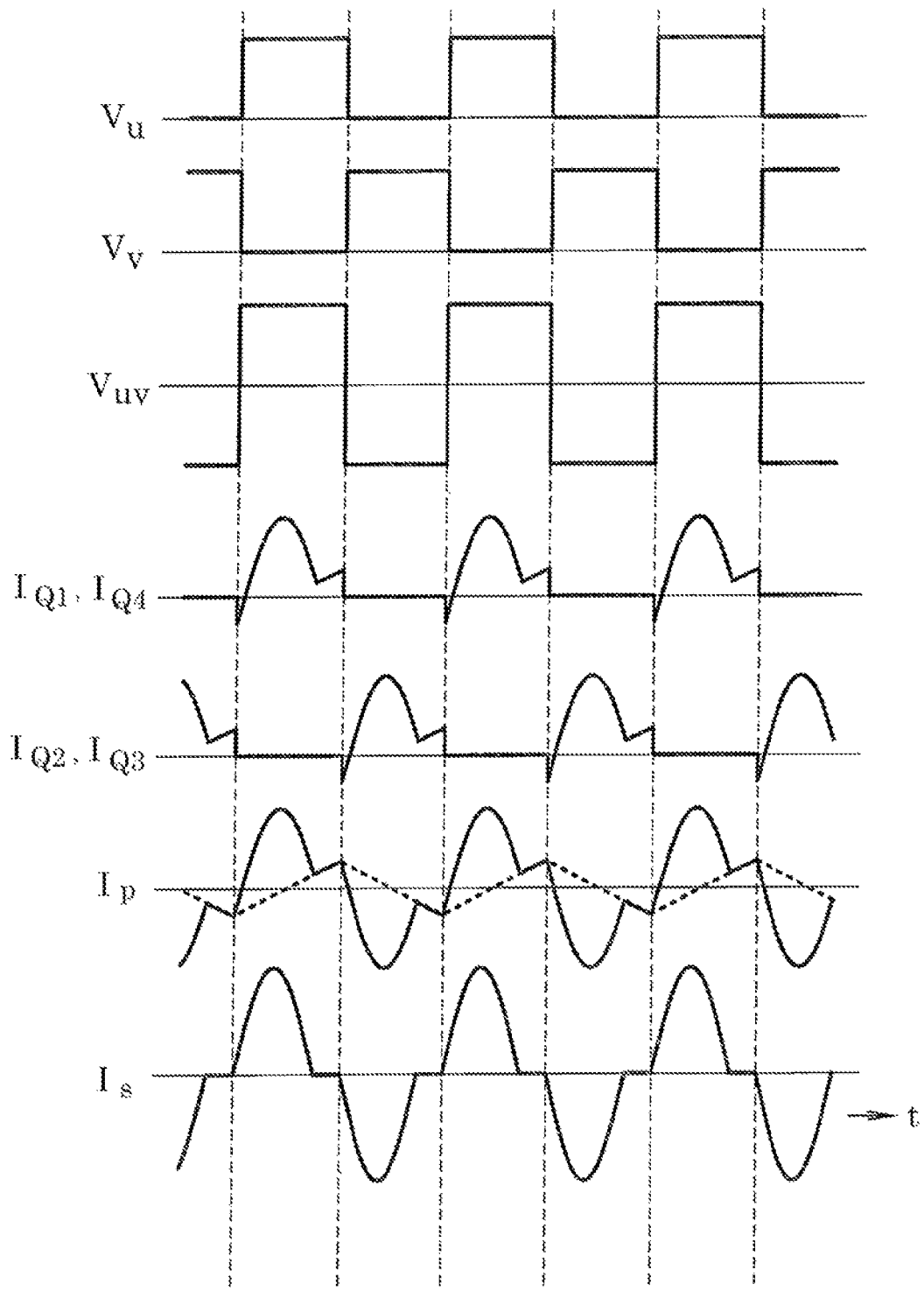
FIG. 8 is a waveform diagram representing a main circuit operation when pulse width modulation control is executed in the first example.

FIG. 7 is a waveform diagram for illustrating an operation of the control device Cont in the first example when frequency modulation control is executed, while FIG. 8 is a waveform diagram for illustrating an operation of the main circuit.

In the frequency modulation control region, as is clear from FIG. 8, the MOSFETs are turned off after a half cycle of the resonance current is passed, because of which the momentary value of the resonance current when turning off is sufficiently smaller than the peak value of the resonance current, becoming equivalent to the exciting current of the transformer Tr (broken line portions of the $I_p$ waveform). Because of this, according to the example, it is possible to reduce turn-off loss.

Figure 9:
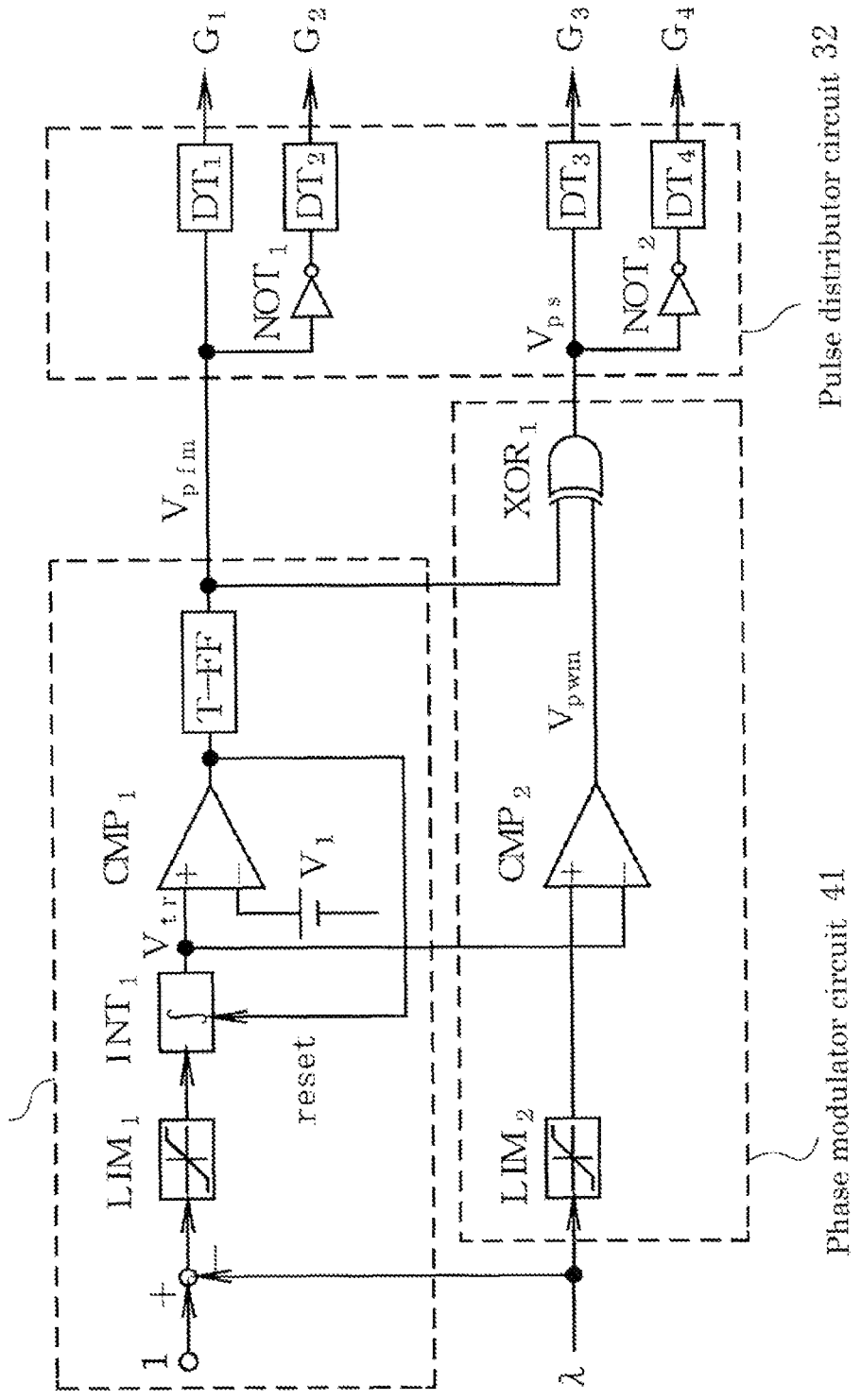
FIG. 9 is a block diagram showing a second example of the control device in the embodiment of the invention.

Next, FIG. 9 is a block diagram showing a second example of the control device Cont in the embodiment. In FIG. 9, the same reference signs are given to components the same as those in FIG. 4 and a description is omitted, and hereafter, the description will center on portions differing from FIG. 4.

In FIG. 9, 41 is a phase modulator circuit acting as the fixed frequency control means, wherein the phase modulator circuit 41 is configured of the limiter $LIM_2$, the comparator $CMP_2$, and an exclusive OR gate $XOR_1$. The pulse width modulation signal $V_{pwm}$, which is the output of the comparator $CMP_2$, and the frequency modulation signal $V_{pfm}$, which is the output of the T flip-flop T-FF, are input into the exclusive OR gate $XOR_1$, and a phase modulation signal $V_{ps}$, which is the output of the exclusive OR gate $XOR_1$, and the frequency modulation signal $V_{pfm}$ are input into a pulse distributor circuit 32.

The pulse distributor circuit 32 includes the on-delay circuit $DT_1$, which applies the delay time $t_d$ to the frequency modulation signal $V_{pfm}$ to generate the gate pulse $G_1$, the NOT gate $NOT_1$, which inverts the logic of the frequency modulation signal $V_{pfm}$, and the on-delay circuit $DT_2$, which applies the delay time $t_d$ to the output signal of the NOT gate $NOT_1$ to generate the gate pulse $G_2$. Furthermore, the pulse distributor circuit 32 includes an on-delay circuit $DT_3$, which applies the delay time $t_d$ to the phase modulation signal $V_{ps}$ to generate the gate pulse $G_3$, a NOT gate $NOT_2$, which inverts the logic of the phase modulation signal $V_{ps}$, and an on-delay circuit $DT_1$, which applies the delay time $t_d$ to the output signal of the NOT gate $NOT_2$ to generate the gate pulse $G_4$.

Figure 10:
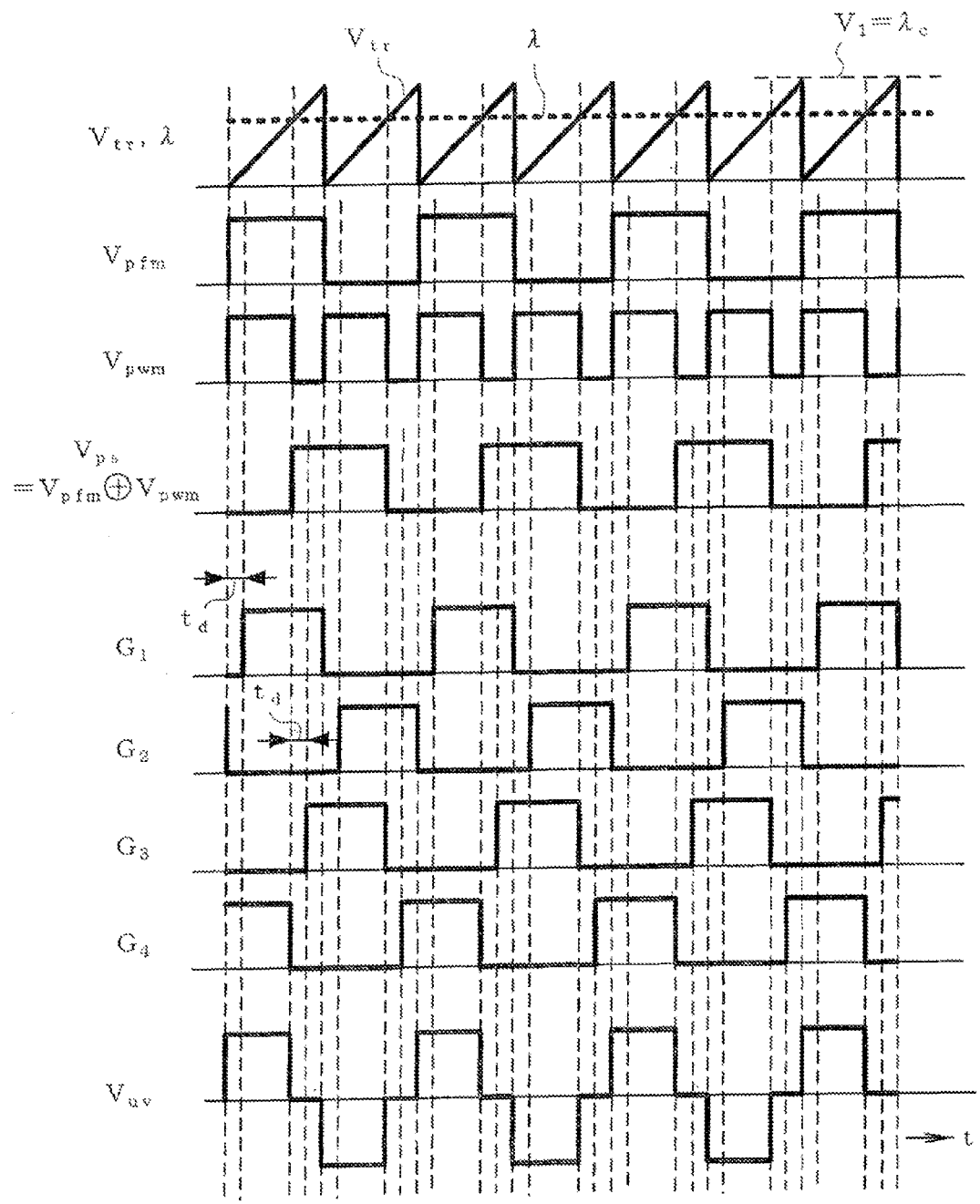
FIG. 10 is a waveform diagram representing a control operation when phase modulation control is executed in the second example.
Figure 11:
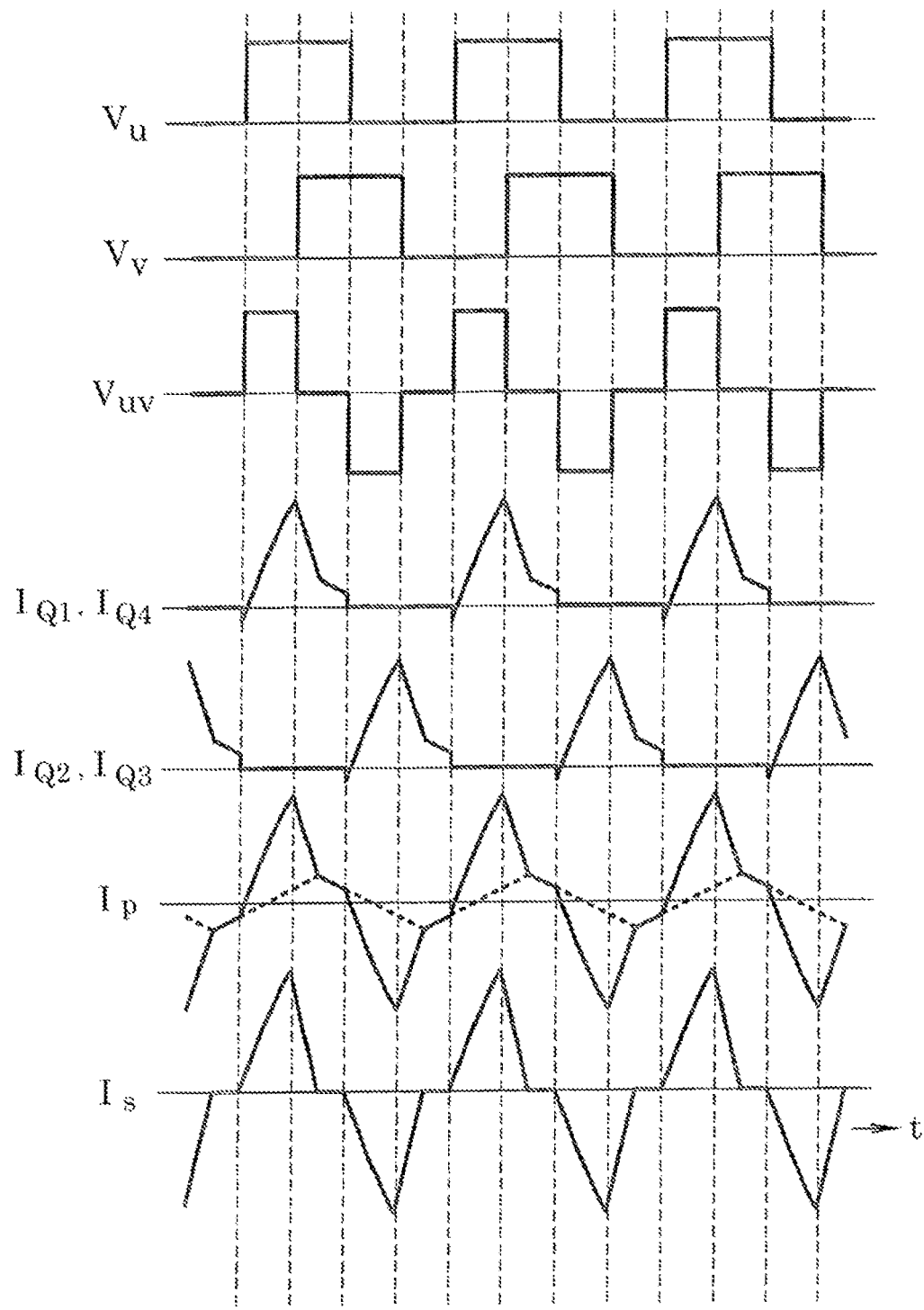
FIG. 11 is a waveform diagram showing a main circuit operation when phase modulation control is executed in the second example.
Figure 12:
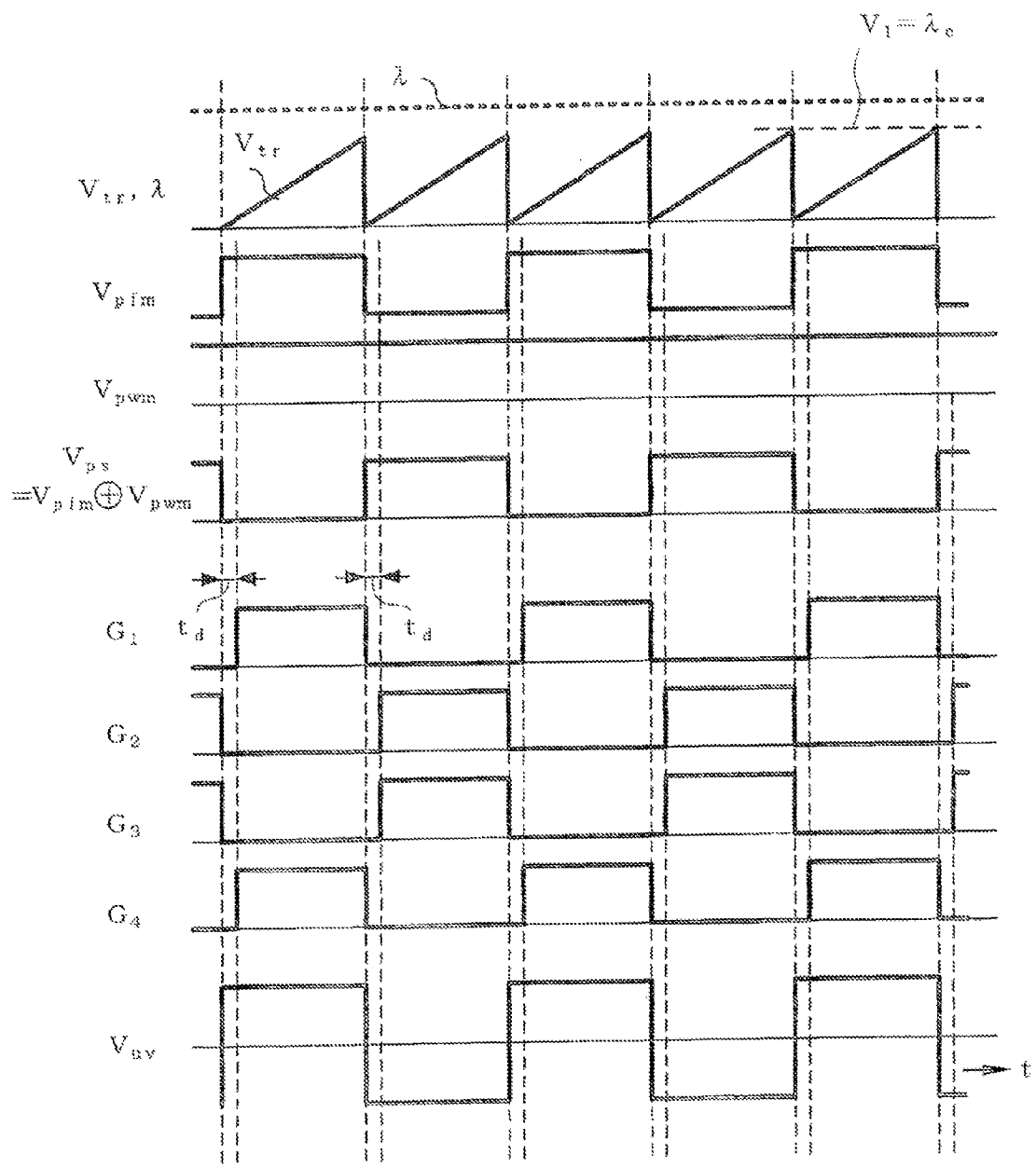
FIG. 12 is a waveform diagram showing a control operation when frequency modulation control is executed in the second example.

FIG. 10 is a waveform diagram for illustrating an operation of the control device Cont in the second example when phase modulation control is executed, while FIG. 11 is a waveform diagram showing a main circuit operation when phase modulation control is executed. FIG. 12 is a waveform diagram for illustrating an operation of the control device Cont when frequency modulation control is executed. As the main circuit operation waveforms when frequency modulation control is executed are the same as those in FIG. 8, a depiction and description thereof are omitted.

As the frequency modulation signal $V_{pfm}$ and pulse width modulation signal $V_{pwm}$ are output in accordance with the relationship between the sizes of $\lambda$ and $\lambda_c$ in the second example too, the waveforms of $V_{pfm}$ and $V_{pwm}$ in FIG. 10 are the same as in FIG. 4. In the second example, however, the phase modulation signal $V_{ps}$ is generated from the exclusive logical sum of the frequency modulation signal $V_{pfm}$ and the pulse width modulation signal $V_{pwm}$, as shown in FIGS. 9 and 10, and the phase modulation signal $V_{ps}$ is provided together with the frequency modulation signal $V_{pfm}$ to the pulse distributor circuit 32.

Herein, in a phase modulation control region, as shown in FIG. 11, the MOSFETs are turned off after the resonance current becomes zero, because of which the momentary value of the resonance current when turning off is sufficiently smaller than the peak value of the resonance current, becoming equivalent to the exciting current of the transformer Tr (broken line portions of the $I_p$ waveform). Because of this, it is possible to reduce turn-off loss in this example too.

Figure 13:
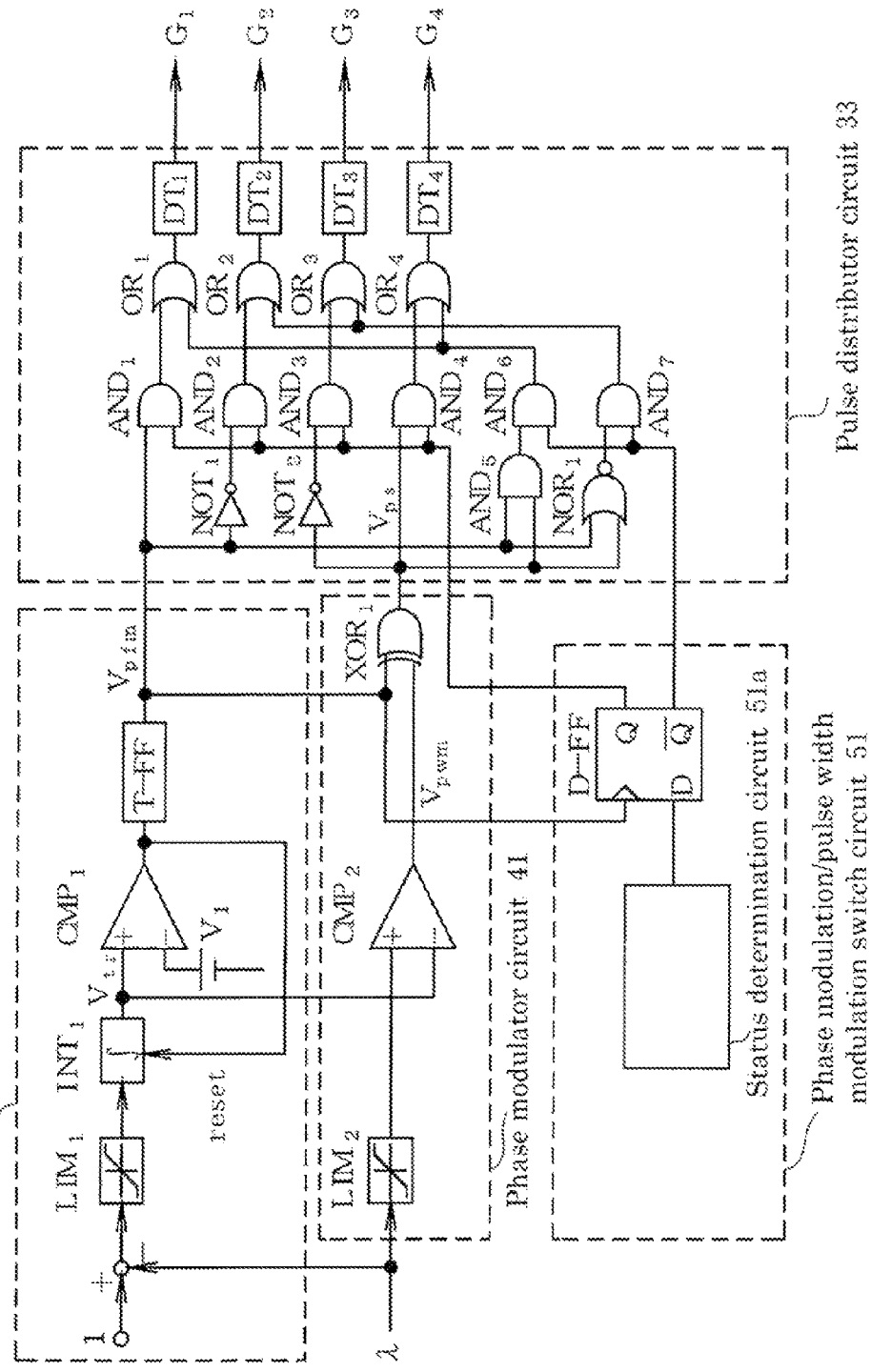
FIG. 13 is a block diagram showing a third example of the control device in the embodiment of the invention.
Figure 14:
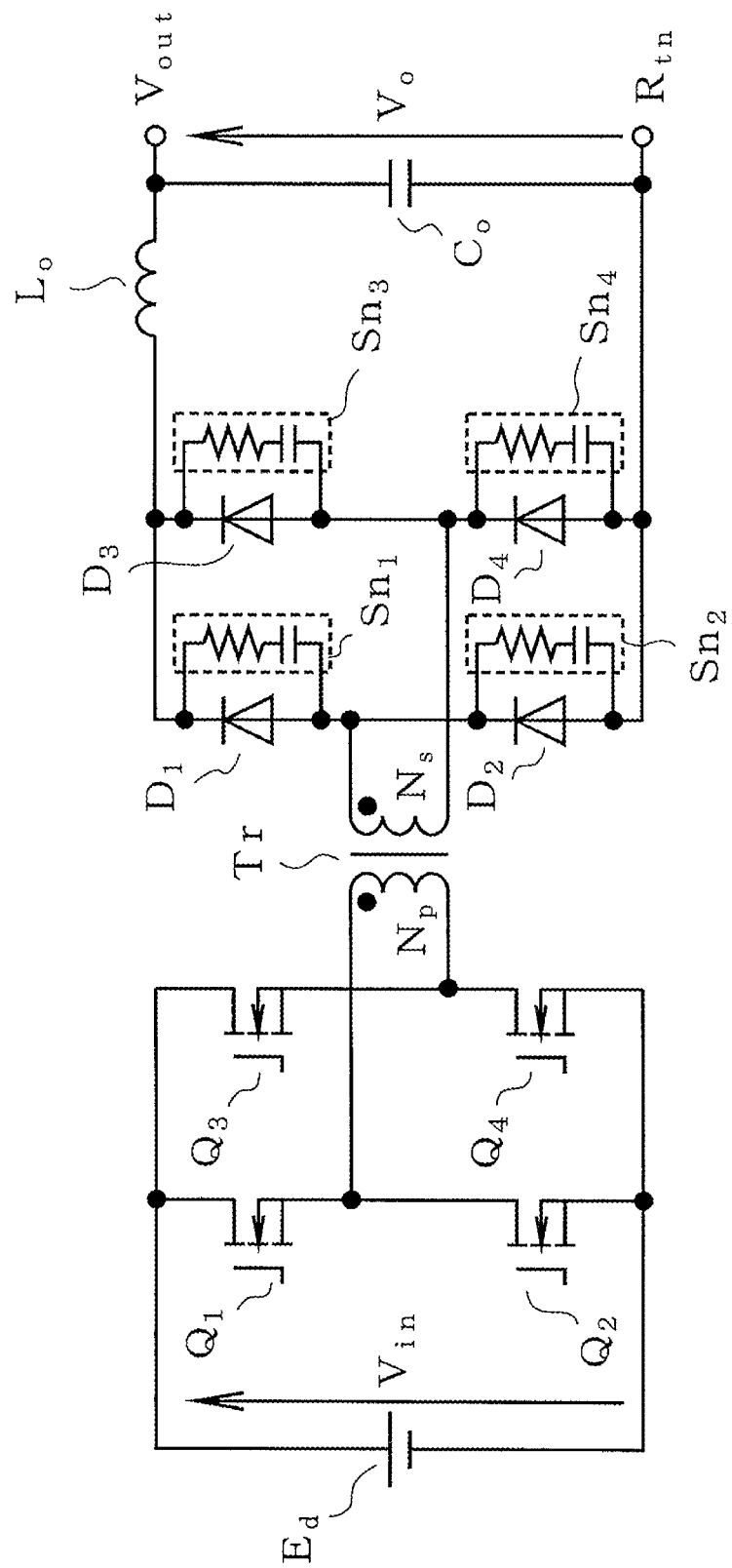
FIG. 14 is a main circuit configuration diagram of a heretofore known DC-DC converter.
Figure 15:
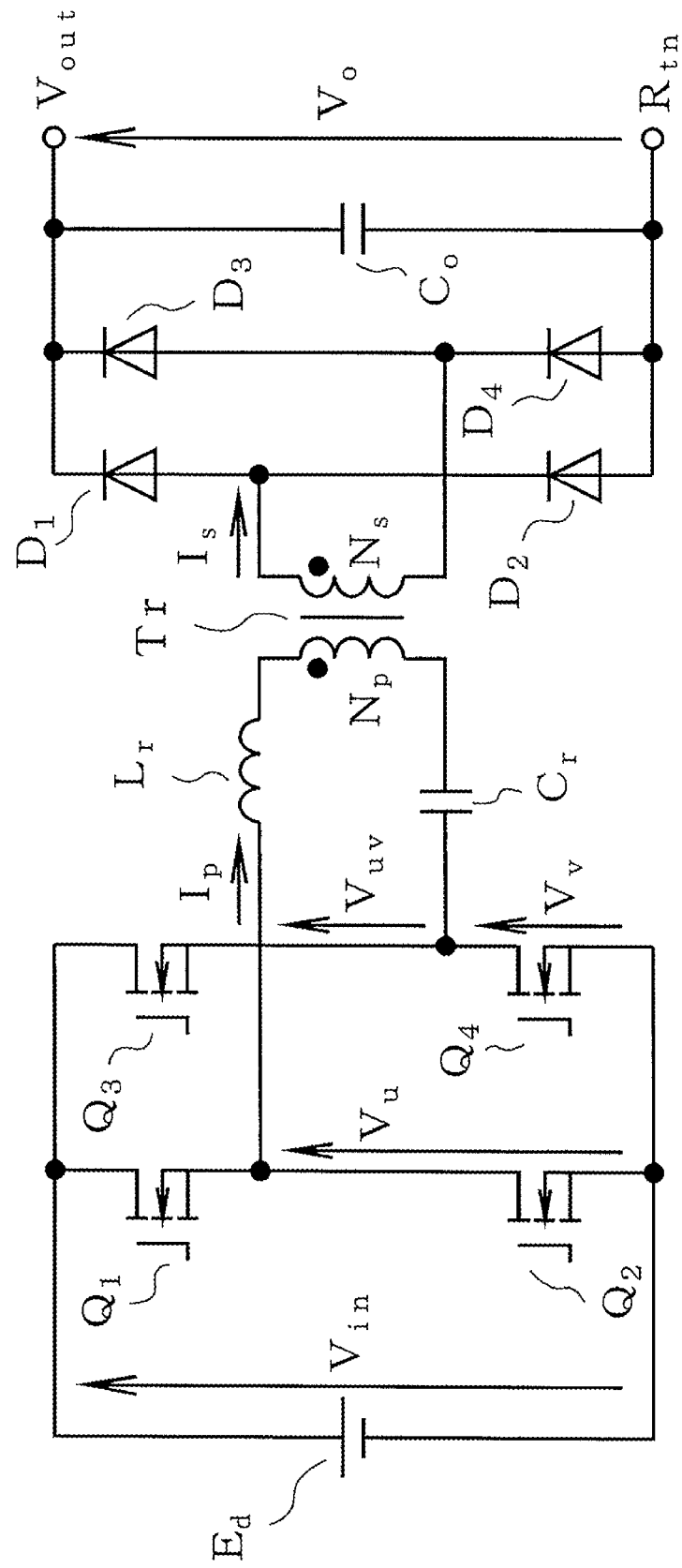
FIG. 15 is a main circuit configuration diagram of a heretofore known resonant DC-DC converter.
Figure 16:
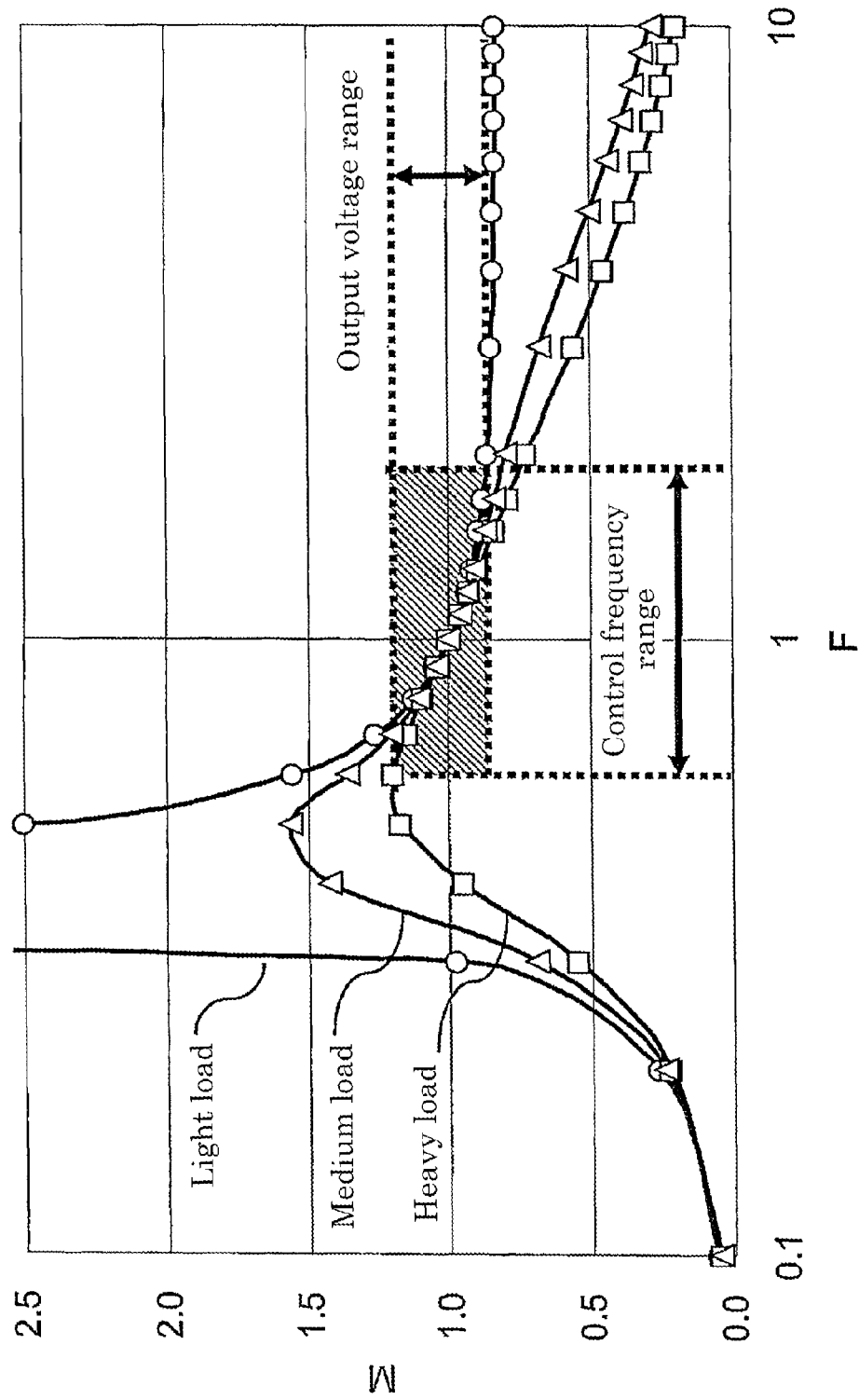
FIG. 16 is a characteristic diagram showing the relationship between a normalized frequency and a normalized voltage conversion rate in order to illustrate heretofore known frequency modulation control characteristics.
Figure 17:
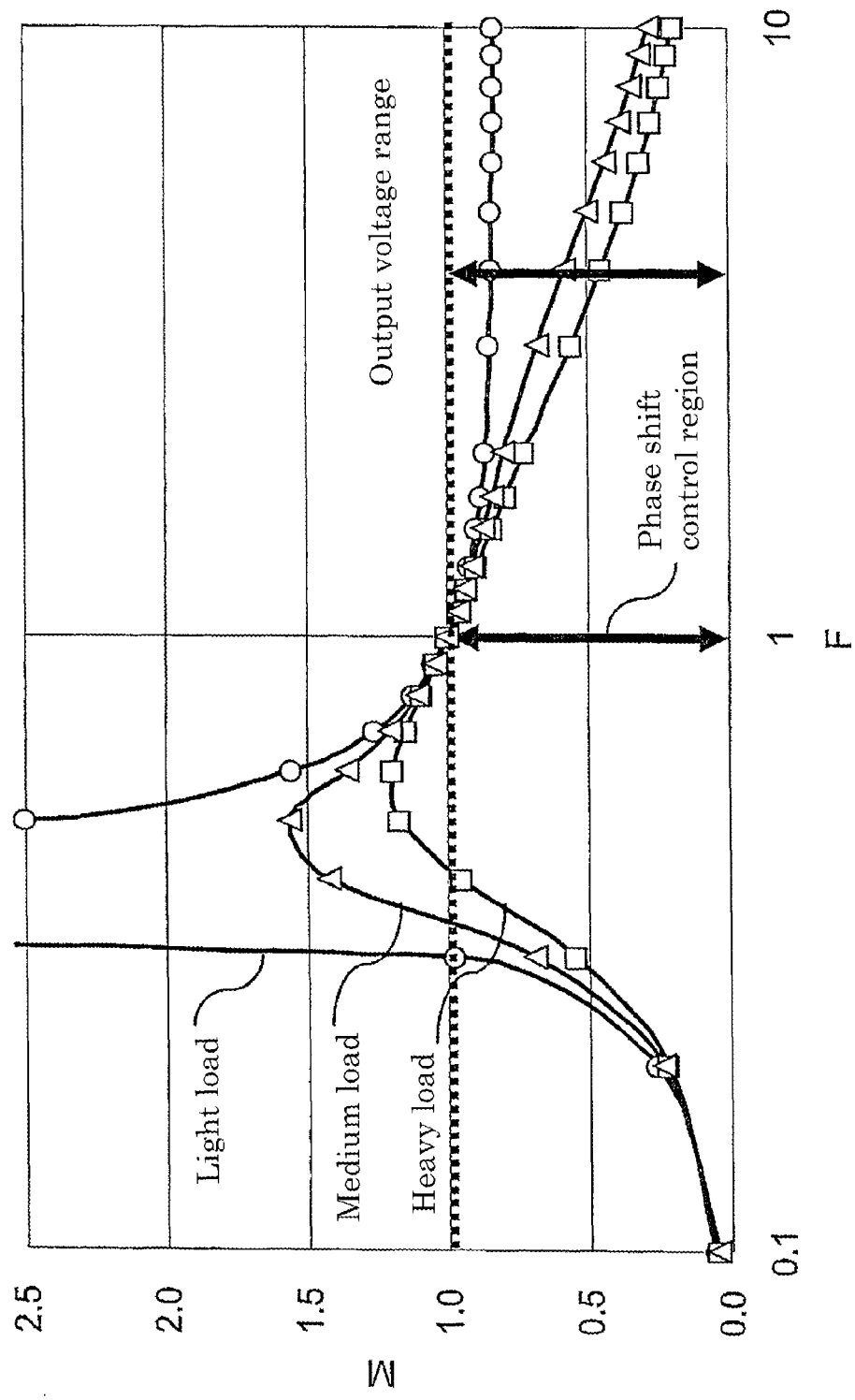
FIG. 17 is a characteristic diagram showing the relationship between a normalized frequency and a normalized voltage conversion rate in order to illustrate heretofore known phase modulation control characteristics.
Figure 18:
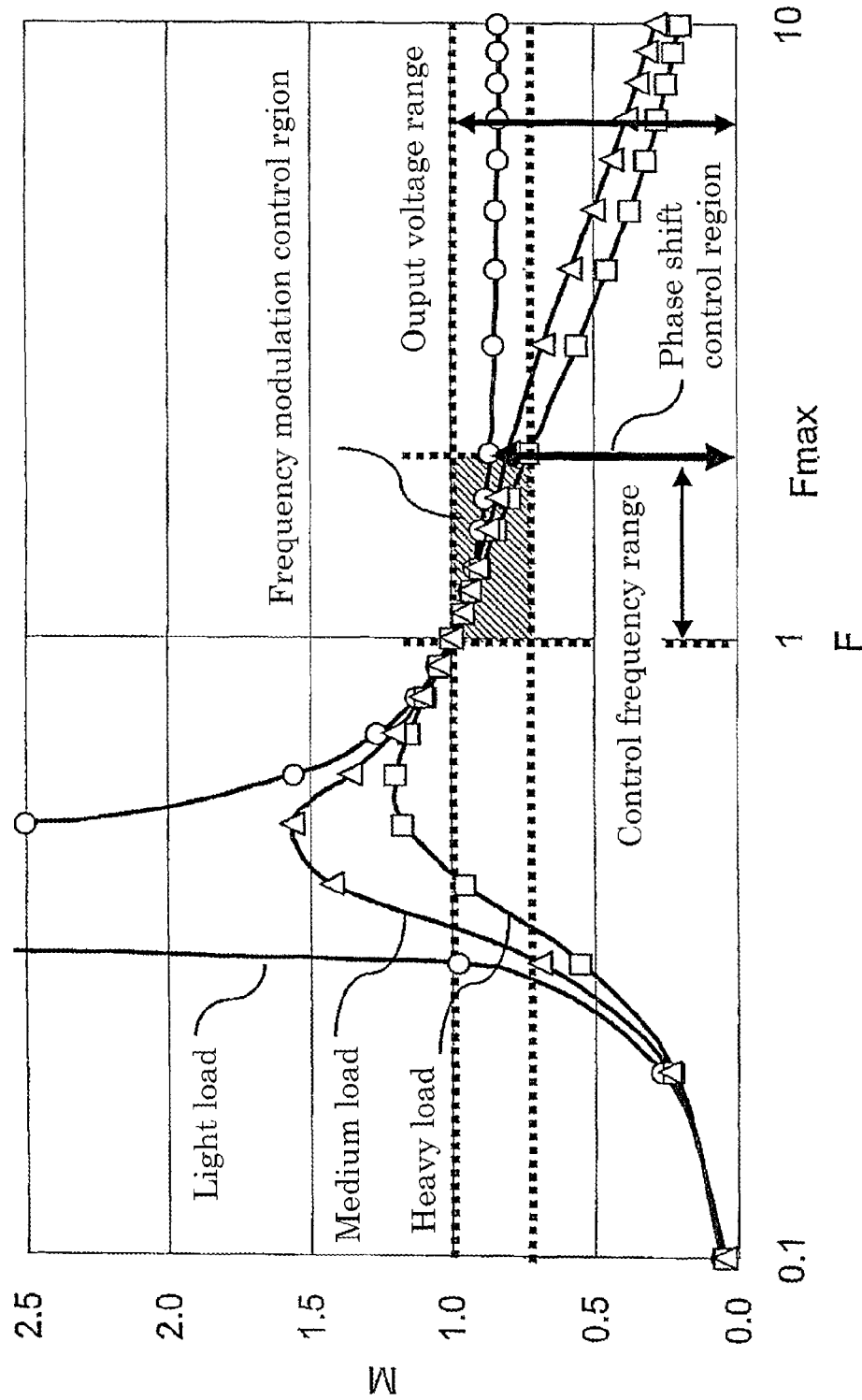
FIG. 18 is a characteristic diagram showing the relationship between a normalized frequency and a normalized voltage conversion rate when switching between a heretofore known frequency modulation control and phase modulation control.

FIG. 13 is a block diagram showing a third example of the control device Cont in the embodiment. In FIG. 13, the same reference signs are given to components the same as those in FIG. 9 and a description omitted, and hereafter, the description will center on portions differing from FIG. 9.

As shown in FIG. 13, the control device Cont of the third example includes the frequency modulator circuit 11, the phase modulator circuit 41, a phase modulation/pulse width modulation switch circuit 51, and a pulse distributor circuit 33. Herein, the configurations of the frequency modulator circuit 11 and phase modulator circuit 41 are the same as in FIG. 9.

The phase modulation/pulse width modulation switch circuit 51 is configured of a status determination circuit 51a and a D flip-flop D-FF. Operation is such that the status determination circuit 51a determines the size of a load, the size of a direct current output voltage, and the like, and switching is carried out between phase modulation control and pulse width modulation control in accordance with a Q output and an inverted output thereof obtained by the result of the determination being input into the D flip-flop D-FF.

The frequency modulation signal $V_{pfm}$ is input as a clock signal into the D flip-flop D-FF, and the D flip-flop D-FF operates using a so-called leading edge trigger method. That is, in order to prevent the gate pulses $G_1$ to $G_4$ from switching partway through when the status determination result from the status determination circuit 51a changes, the D flip-flop D-FF is caused to operate at the timing of the rise of the frequency modulation signal $V_{pfm}$, thus switching between phase modulation control and pulse width modulation control.

In the pulse distributor circuit 33, the frequency modulation signal $V_{pfm}$ is input into one input terminal of each of AND gates $AND_1$ and $AND_5$ and a NOR gate $NOR_1$, and into the NOT gate $NOT_1$. Also, the phase modulation signal $V_{ps}$ is input into the NOT gate $NOT_2$, one input terminal of an AND gate $AND_4$, the other input terminal of the AND gate $AND_5$, and the other input terminal of the NOR gate $NOR_1$. Furthermore, the outputs of the NOT gates $NOT_1$ and $NOT_2$ are input into one input terminal of the AND gate $AND_2$ and an AND gate $AND_3$ respectively. Also, the output of the AND gate $AND_5$ is input into one input terminal of an AND gate $AND_6$, and the output of the NOR gate $NOR_1$ is input into one input terminal of an AND gate $AND_7$.

The Q output of the D flip-flop D-FF is input into the other input terminal of each of the AND gates $AND_1$ to $AND_4$, and the inverted output of the D flip-flop D-FF is input into the other input terminal of each of the AND gates $AND_6$ and $AND_7$.

The outputs of the AND gates $AND_1$ to $AND_4$ are input into one input terminal of OR gates $OR_1$ to $OR_4$ respectively. Also, the output of the AND gate $AND_6$ is input into the other input terminal of each of the OR gates $OR_1$ and $OR_4$, while the output of the AND gate $AND_7$ is input into the other input terminal of each of the OR gates $OR_2$ and $OR_3$.

Further, the outputs of the OR gates $OR_1$ to $OR_4$ are input into the on-delay circuits $DT_1$ to $DT_4$ respectively, the delay time $t_d$ is applied thereto, and they are output as the gate pulses $G_1$ to $G_4$ of the MOSFETs $Q_1$ to $Q_4$.

Normally, when executing phase modulation control, there is a problem in that the lighter the load, the longer the period for which current flows back among the MOSFETs, and the more conduction loss increases. Because of this, this example is such that the status determination circuit 51a detects that there is a light load, and switches to pulse width modulation control via the D flip-flop D-FF. Because of this, all of the MOSFETs are in an off-state during a non-exciting period of the transformer Tr in FIG. 1, because of which no backflow of current occurs among the MOSFETs, and it is possible to reduce conduction loss.

Also, when carrying out phase modulation control or frequency modulation control in a state wherein the smoothing capacitor $C_o$ on the direct current output side is not charged when starting up the DC-DC converter 100, or the like, there is concern that the previously described off-resonance will occur, and that the MOSFET will be damaged by reverse recovery of the parasitic diode of the MOSFET. As a countermeasure for this, it is preferable that the status determination circuit 51a detects that the DC-DC converter 100 is in a started-up state based on the direct current output voltage $V_o$. Further, when starting up, it is possible to prevent the above-described reverse recovery from occurring, and to protect the MOSFETs, by switching between phase modulation control and frequency modulation control via the D-flip-flop D-FF after causing pulse width modulation control to be carried out using a pulse of a width sufficiently shorter than a half cycle of the resonance frequency $F_r$, thus initially charging the smoothing capacitor $C_o$ to a certain voltage.

The first to third examples of the control device Cont shown in FIG. 4, FIG. 9, and FIG. 13 may be realized using an analog circuit, or may be realized by digital control means having the same functions.

INDUSTRIAL APPLICABILITY

The invention is applicable to various kinds of resonant DC-DC converter for obtaining a predetermined direct current voltage, such as a vehicle-mounted charging device that charges a battery of a hybrid vehicle, electric vehicle, or the like.

REFERENCE SIGNS LIST $E_d$: Direct current power supply
$Q_1, Q_2, Q_3, Q_4$: MOSFET
$L_r$: Inductor
$C_r, C_o$: Capacitor
Tr: Transformer
$N_p$: Primary coil
$N_s$: Secondary coil
$D_1, D_2, D_3, D_4$: Diode
$R_a, R_b$: Resistor
$LIM_1, LIM_2$: Limiter
$INT_1$: Integrator
$CMP_1, CMP_2$: Comparator
T-FF: T flip-flop
D-FF: D flip-flop
$XOR_1$: Exclusive OR gate
$AND_1$ to $AND_7$: AND gate
$OR_1$ to $OR_4$: OR gate
$NOT_1, NOT_2$: NOT gate
$NOR_1$: NOR gate
$DT_1$ to $DT_4$: On-delay circuit
Cont: Control device
CT: Current detector
11: Frequency modulator circuit
21: Pulse width modulator circuit
31, 32, 33: Pulse distributor circuit
41: Phase modulator circuit
51: Phase modulation/pulse width modulation switch circuit
51a: Status determination circuit
100: Main circuit

The invention claimed is:

1. A control device for a resonant DC-DC converter, the resonant DC-DC converter including:
   a direct current power supply;
   a full-bridge circuit of which the input side is connected to ends of the direct current power supply and to an output side of which a primary coil of a transformer is connected via a series resonant circuit, and which is configured of semiconductor switching elements;
a rectifier circuit connected to a secondary coil of the transformer; and
a smoothing capacitor connected to an output side of the rectifier circuit, wherein,
by the semiconductor switching elements being turned on and off to cause a resonance current to flow through the series resonant circuit, a direct current output voltage is output via the transformer, the rectifier circuit, and the smoothing capacitor,
the control device comprising:
a means for detecting a quantity of electricity in accordance with a status of a load of the resonant DC-DC converter and determining a control amount for controlling the turning on and off of the semiconductor switching elements;
a frequency modulation control means for executing a frequency modulation control of the semiconductor switching elements at a frequency lower than a resonance frequency of the series resonant circuit based on the control amount;
a fixed frequency control means for executing a fixed frequency control of the semiconductor switching elements at a frequency in a vicinity of the resonance frequency based on the control amount; and
a pulse distribution means for generating drive pulses of the semiconductor switching elements based on outputs of the frequency modulation control means and the fixed frequency control means, wherein,
when the direct current output voltage of the resonant DC-DC converter reaches a value that exceeds a maximum value that can be output in a fixed frequency control region, the control amount causes a switch from a control operation by the fixed frequency control means to a control operation by the frequency modulation control means.

2. The resonant DC-DC converter control device according to claim 1, wherein
the fixed frequency control means executes pulse width modulation control of the semiconductor switching elements.

3. The resonant DC-DC converter control device according to claim 1, wherein
the fixed frequency control means executes phase modulation control of the semiconductor switching elements.

4. The resonant DC-DC converter control device according to claim 1, wherein
the fixed frequency control means executes pulse width modulation control and phase modulation control of the semiconductor switching elements.

5. The resonant DC-DC converter control device according to claim 1, wherein a direct current output voltage detection value and direct current output current detection value of the resonant DC-DC converter are used in order to determine the control amount.

6. The resonant DC-DC converter control device according to claim 2, wherein
the fixed frequency control means compares the control amount and a carrier signal generated by the frequency modulation control means, and generates a pulse width modulation signal.

7. The resonant DC-DC converter control device according to claim 2, wherein
when the resonant DC-DC converter is started up, a switch is made to frequency modulation control by the frequency modulation control means after the fixed frequency control means executes pulse width modulation control, thus initially charging the smoothing capacitor in a state wherein a pulse width is shorter than a half cycle of the resonance frequency of the series resonant circuit.

8. The resonant DC-DC converter control device according to claim 2, wherein a direct current output voltage detection value and direct current output current detection value of the resonant DC-DC converter are used in order to determine the control amount.

9. The resonant DC-DC converter control device according to claim 3, wherein
the fixed frequency control means compares the control amount and a carrier signal generated by the frequency modulation control means, generates a pulse width modulation signal, and generates a phase modulation signal from the pulse width modulation signal and a frequency modulation signal generated by the frequency modulation control means.

10. The resonant DC-DC converter control device according to claim 3, wherein a direct current output voltage detection value and direct current output current detection value of the resonant DC-DC converter are used in order to determine the control amount.

11. The resonant DC-DC converter control device according to claim 4, wherein
the fixed frequency control means compares the control amount and a carrier signal generated by the frequency modulation control means, generates a pulse width modulation signal, generates a phase modulation signal from the pulse width modulation signal and a frequency modulation signal generated by the frequency modulation control means, and switches between pulse width modulation control and phase modulation control in accordance with a direct current output current or direct current output voltage of the resonant DC-DC converter.

12. The resonant DC-DC converter control device according to claim 4, wherein a direct current output voltage detection value and direct current output current detection value of the resonant DC-DC converter are used in order to determine the control amount.

13. The resonant DC-DC converter control device according to claim 6, wherein a direct current output voltage detection value and direct current output current detection value of the resonant DC-DC converter are used in order to determine the control amount.

14. The resonant DC-DC converter control device according to claim 9, wherein a direct current output voltage detection value and direct current output current detection value of the resonant DC-DC converter are used in order to determine the control amount.

15. The resonant DC-DC converter control device according to claim 11, wherein
the fixed frequency control means, when the resonant DC-DC converter is started up, switches to phase modulation control after executing pulse width modulation control, thus initially charging the smoothing capacitor in a state wherein a pulse width is shorter than a half cycle of the resonance frequency of the series resonant circuit.

* * * * *